(12) United States Patent
Brown

(10) Patent No.: US 8,001,535 B2
(45) Date of Patent: Aug. 16, 2011

(54) COMPUTER SYSTEM AND METHOD OF ADAPTING A COMPUTER SYSTEM TO SUPPORT A REGISTER WINDOW ARCHITECTURE

(75) Inventor: Alexander B. Brown, Sheffield (GB)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/904,601

(22) Filed: Sep. 27, 2007

(65) Prior Publication Data
US 2008/0209175 A1  Aug. 28, 2008

Related U.S. Application Data

(60) Provisional application No. 60/853,924, filed on Oct. 24, 2006.

(30) Foreign Application Priority Data

Oct. 2, 2006 (GB) .................................. 0619380.9

(51) Int. Cl.
G06F 9/45 (2006.01)
(52) U.S. Cl. ....................................................... 717/138
(58) Field of Classification Search ..................... 717/138
See application file for complete search history.

(56) References Cited

U.S. PATENT DOCUMENTS

| | | | |
|---|---|---|---|
| 6,131,188 A | | 10/2000 | Goebel |
| 2004/0133766 A1* | | 7/2004 | Abraham et al. ............. 712/217 |
| 2004/0210880 A1* | | 10/2004 | Souloglou et al. ............ 717/138 |
| 2004/0221280 A1* | | 11/2004 | Bolton et al. ................. 717/151 |
| 2004/0243983 A1* | | 12/2004 | Kumura ........................ 717/136 |
| 2005/0015758 A1 | | 1/2005 | North |
| 2005/0102494 A1* | | 5/2005 | Grochowski et al. ......... 712/228 |
| 2005/0235093 A1* | | 10/2005 | Shelor .............................. 711/1 |
| 2006/0200811 A1 | | 9/2006 | Cheng |
| 2008/0209175 A1* | | 8/2008 | Brown .......................... 712/208 |

FOREIGN PATENT DOCUMENTS

WO    WO-99/57635    11/1999

(Continued)

OTHER PUBLICATIONS

Search Report issued for GB0619380.9, dated Feb. 1, 2007.

(Continued)

*Primary Examiner* — Philip Wang
(74) *Attorney, Agent, or Firm* — Matthew B. Talpis

(57) ABSTRACT

A target computing system 10 is adapted to support a register window architecture, particularly for use when converting non-native subject code 17 instead into target code 21 executed by a target processor 13. A subject register stack data structure (an "SR stack") 400 in memory has a plurality of frames 410 each containing a set of entries 401 corresponding to a subset of subject registers 502 of one register window 510 in a subject processor 3. The SR stack 400 is accessed by the target code 21 executing on the target processor 13. The SR stack 400 stores a large plurality of such frames 410 and thereby avoids overhead such as modelling automatic spill and fill operations from the windowed register file of the subject architecture. In one embodiment, a target computing system 10 having sixteen general purpose working registers is adapted to support a register window architecture reliant upon a register file containing tens or hundreds of subject registers 502.

25 Claims, 12 Drawing Sheets

FOREIGN PATENT DOCUMENTS

| WO | WO-00/22521 | 4/2000 |
|---|---|---|
| WO | WO-02/29563 | 4/2002 |
| WO | WO-03/005187 | 1/2003 |
| WO | WO-2004/095264 | 11/2004 |
| WO | WO-2004/097631 | 11/2004 |
| WO | WO-2005/006106 | 1/2005 |
| WO | WO-2005/008478 | 1/2005 |
| WO | WO-2006/103395 | 10/2006 |

OTHER PUBLICATIONS

Palmer T. et al: "Experiences Constructing a Lightweight SPARC Interpreter for a Dynamic Binary Translator", Internet Article, [Online] Mar. 14, 2003, pp. 1-9 XP002472427. retrieved from the Internet: URL: http://web.archive.org/web/20060303040446/http://www.cs.umass.edu/~trekp/sind-exprs.pdf.

Weaver D. et al: "The SPARC Architecture Manual—Version 9", Internet Article, [Online] Sep. 2000, XP002472428, retrieved from the Internet: URL: http://developers.sun.com/solaris/articles/sparcv9.pdf.

Palmer, et al., "Experiences Constructing a Lightweight SPARC Interpreter for a Dynamic Binary Translator", Internet Article [Online], Mar. 14, 2003, http://web.archive.org/web/20030303040446/http://www.cs.umass.edu/{trekp/sind-exprs.pdf>.

Weaver, et al., "The SPARC Architecture Manual—Version 9", Internet Article, [Online] Sep. 2000, http://developers.sun.com/solaris/articles/sparcv9.pdf.

International Search Report issued for PCT/GB2007/050586, dated Mar. 12, 2008.

\* cited by examiner

Fig. 7

| Subject Code | Register Reference (175) | Entry Adjustment (in 64-bit words) | Identified Register Window Movement (176) | Frame Movement of SR_SP | Target Code |
|---|---|---|---|---|---|
| subject block 17a: | | | | | target block 21a: |
| | | | | | [header code (211)] |
| func1: mov l7=#3 | l7 | +15 | (none) | 0 | mov rax, #3<br>mov (rbp + 15), rax |
| mov l3=#10 | l3 | +11 | (none) | 0 | mov rbx, #10<br>mov (rbp + 11), rbx |
| add o6=l7,l3 | l7 | +15 | (none) | 0 | add rax, rbx<br>mov (rbp + 6), rax |
| | l3 | +11 | | | |
| | o6 | +6 | | | |
| save | | | SAVE(-1) | -1 | add rbp, -1*16 |
| | | | | | [footer code (211)] |
| subject block 17b: | | | | | target block 21b: |
| | | | | | [header code (211)] |
| add l3=l3,-1 | l3 | +13 | (none) | 0 | add (rbp+11), -1 |
| restore | | | RESTORE(+1) | +1 | add rbp, +1*16 |
| return | | | (none) | | [footer code (211)] |

Fig. 8A

| Subject Code | Register Reference (175) | Displacement (177) (in 64-bit words) | Identified Movement (176) | Frame Offset (178) (in frames of 16 x 64 bit words) | Target Code |
|---|---|---|---|---|---|
| subject block 17a: | | | | | target block 21a: |
| | | | | | [header code] |
| func1:  mov l7=#3 | 17 | +15 | (none) | 0 | mov rax, #3<br>mov (rbp + 15), rax |
| mov l3=#10 | 13 | +11 | (none) | 0 | mov rbx, #10<br>mov (rbp + 11), rbx |
| add l3=l7,o6 | 17<br>13<br>o6 | +15<br>+11<br>+6 | (none) | 0 | add rax, rbx<br>mov (rbp + 6), rax |
| save | | | SAVE(-1) | -1 * 16 | add rbp, -1*16 |
| add l3=l3,-1 | 13 | +11 | (none) | -1 * 16 | add (rbp+11), -1 |
| restore | | | RESTORE(+1) | 0 | add rbp, +1*16 |
| return | | | | | [footer code] |

Fig. 8B

| save | | | SAVE(-1) | -1 * 16 | |
| add l3=l3,-1 | 13 | +11 | (none) | -1 * 16 | add (rbp -5),-1 |
| restore | | | RESTORE(+1) | 0 | |

COMPUTER SYSTEM AND METHOD OF ADAPTING A COMPUTER SYSTEM TO SUPPORT A REGISTER WINDOW ARCHITECTURE

CROSS REFERENCE TO RELATED APPLICATIONS

This application claims benefit of GB Patent Application No. 0619380.9, filed Oct. 2, 2006 and U.S. Provisional Patent Application Ser. No. 60/853,924, filed Oct. 24, 2006.

FIELD OF THE INVENTION

The present invention relates generally to the field of computers and computer systems. More particularly, the present invention relates to a computer system which is adapted to support a register window architecture and to a method of adapting a computer system to support a register window architecture.

BACKGROUND OF THE INVENTION

The central processing unit (CPU) or processor lies at the heart of all modern computing systems. The processor executes instructions of a computer program and thus enables the computer to perform useful work. CPUs are prevalent in all forms of digital devices in modern life and not just dedicated computing machines such as personal computers, laptops and PDAs. Modern microprocessors appear in everything from automobiles to washing machines to children's toys.

A problem arises in that program code which is executable by one type of processor often cannot be executed in any other type of processor. Firstly, each type of processor has its own unique Instruction Set Architecture (ISA). Secondly, processors often have unique hardware features which are not present on other types of processor. Hence, the field of program code conversion has evolved to automatically convert program code written for one type of processor into code which is executable instead by another type of processor, or to optimise an old, inefficient piece of code into a newer, faster version for the same type of processor. That is, in both embedded and non-embedded CPUs, there are predominant ISAs for which large bodies of software already exist that could be "accelerated" for performance or "translated" to other processors that present better cost/performance benefits. One also finds dominant CPU architectures that are locked in time to their ISA and cannot evolve in performance or market reach. This problem applies at all levels of the electronics industry, from stand-alone pocket-sized devices right through to massive networks having tens or hundreds of powerful computers.

As background information in this field of program code conversion, PCT publications WO2000/22521 entitled "Program Code Conversion", WO2004/095264 entitled "Method and Apparatus for Performing Interpreter Optimizations during Program Code Conversion", WO2004/097631 entitled "Improved Architecture for Generating Intermediate Representations for Program Code Conversion", WO2005/006106 entitled "Method and Apparatus for Performing Adjustable Precision Exception Handling", and WO2006/103395 entitled "Method and Apparatus for Precise Handling of Exceptions During Program Code Conversion", which are all incorporated herein by reference, disclose methods and apparatus to facilitate program code conversion capabilities as may be employed in the example embodiments discussed herein.

Most modern processors include a set of registers as a type of fast-access memory. The processor uses the registers to hold temporary values while executing a sequence of instructions in a computer program. The processor hardware contains a limited number of these registers and, in use, execution of the program can readily fill all of the available registers with temporary data values. This leads to competition for the available registers as the processor moves from one section of code to another, because each section of code will generate temporary values and will need to make use of the registers in the processor to store those temporary data values.

In response to this difficulty, processors have been developed with a register window architecture. For example, register window architectures based on the Berkeley RISC design of the early 1990s provide a large set of hardware registers (the register file) and allow only a small subset of these registers (the register window) to be accessed by the current section of code. The other registers in the register file lying outside the current position of the register window are not accessible by the current section of the computer program. For example, only eight registers are visible at any one time from a register file of sixty-four registers in total. When the processor moves from one section of code to another, such as when a procedure call is performed, then the register window shifts position in the register file and exposes a different subset of the registers for the new section of code. These movements are generally classified as either causing a SAVE type movement where the register window moves to a previously unused position to present a clean set of hardware registers to the executing subject code, or else a RESTORE type movement which shifts the register window back toward a previously exposed position and thus reveals a set of previously used registers to the executing code to thereby restore access to the data values held in those registers. Eventually, however, the finite number of hardware registers in the register file will be exhausted, depending upon the number of procedure call levels invoked by executing the program. Here, a SPILL operation is performed whereby the data values in the registers are moved to a safe location such as in second-tier memory outside the processor. Later, a FILL operation moves these data values back into the hardware registers so that processor can continue execution of the relevant section of code.

This register window architecture is intended to allow the computing system to execute faster, especially where the processor frequently moves from one section of code to another and then returns back to the first section (i.e. performs procedure calls), by avoiding the costly and time-consuming register spill and fill operations for large parts of the computer program.

This register window architecture has been adopted by processors such as the SPARC, the AMD29000 and the Intel i960 on a large commercial scale. Hence, a large body of code has already been written to execute only on these architectures and cannot be run by any other type of processor.

Of these commercial processors, the SPARC is particularly prevalent. Further background information about the SPARC register window architecture is found, for example, in SPARC Architecture Manual, Version 8, Section 4.1, "Registers" and SPARC Architecture Manual, Version 9, Section 5.1, "Registers", published by SPARC International Inc of San Jose, Calif., the disclosure of which is incorporated herein by reference.

As an example, FIG. 1 illustrates the use of register windows in a v9 SPARC architecture of the related art. The v9 SPARC architecture provides a plurality of control/status registers, and a large number of general purpose ("r") registers. The general purpose registers include eight permanently visible global registers (and a further eight global alternates), and a moveable 24-register window divided into eight "in" registers, eight "local" registers and eight "out" registers. The current window into the total register file is given by a Current Window Pointer (CWP) held in one of the control/status registers. The CWP is incremented each time a "restore" instruction is executed, and is decremented for a "save" instruction or when a trap occurs. In this example, the 24-register window partially overlaps with adjacent windows positions, such that the eight "out" registers of one window position overlap with the eight "in" registers of an adjacent window position, whilst the local registers are unique to each window position. That is, the "out" registers of window position CWP+1 are also addressable as the "in" registers of the current window CWP. Also, the "out" registers of the current window CWP are equivalent to the "in" registers of the next window CWP–1. The v9 SPARC architecture supports from a minimum of three to a maximum of thirty-two window positions, depending on the specific hardware implementation. Hence, together with the permanently visible global registers, the v9 SPARC architecture requires 64 to 528 general purpose hardware registers (8 global registers, 8 alternate globals, and 16 registers for each window position).

FIG. 2 illustrates the circular nature of the windowed register file in the example v9 SPARC architecture. The hardware registers are finite in number and in this example there are 128 windowed hardware registers corresponding to eight register window positions. FIG. 2 shows window position W0 as the current window (CWP=0). If a procedure using the current window position W0 executes a RESTORE, then window position W7 will become the current window (CWP=+1). If the procedure at position W0 instead executes a SAVE, then window position W1 becomes the current window. A window overflow trap occurs when all of the register window positions have been consumed, i.e. because those registers already contain valid data from executing previous the sections of program code and should not be overwritten. In the example v9 architecture, window overflow is detected using a CANSAVE control/status register linked to the CWP. At this point, the contents of the registers are spilled to a slower-access area of memory, such as an execution stack in the main subject memory 8, in order to allow execution to continue without overwriting valid data stored in the register file. When the program eventually RESTOREs to the point where the original register values become needed again, a fill operation fills the register values from the stack back into the hardware registers of the register file. Here, a window underflow trap prevents an invalid restore movement of the register window, with reference to a CANRESTORE control/status register.

In this example, the original program code (here called "subject code") relies on a particular type of subject hardware having a register window architecture. However, in the field of program code conversion of the present invention, the subject code is instead converted into target code and executed by a target computing system. That is, it is desired to replace an older subject computer system based on the register window architecture instead with a newer target computer system, but still have the target computer system support the register window architecture of the subject computing system.

An aim of the present invention is to provide a computing system which is adapted to support a register window architecture. Exemplary embodiments aim to adapt a computer system to support a foreign, non-native, register window architecture.

SUMMARY OF THE INVENTION

According to the present invention there is provided a computing system, a method of adapting a computer system, and a computer readable storage medium as set forth in the appended claims. Other features of the invention will be apparent from the dependent claims and the description which follows.

In one exemplary aspect of the present invention there is provided a computing system comprising at least a decoder unit, an encoder unit, a memory and a target processor. The decoder unit is arranged to decode subject code executable by a subject processor of a register window based subject computing architecture where a current register window is positioned to reveal a selected subset of subject registers from a windowed register file The subject code includes window-based instructions which affect the position of the register window in relation to the register file, and register-based instructions which contain references to the registers in the register window. The decoder unit is further arranged to identify the window-based instructions in the subject code intended to cause movement of the register window and to derive register window movement information from the window-based instructions. Further still, decoder unit is arranged to identify the register-based instructions in the subject code and to derive one or more windowed subject register references from the register-based instructions. The memory comprises a stack data structure arranged to store a plurality of entries. The encoder unit is arranged to generate target code from the subject code decoded by the decoder unit. The target processor is arranged to execute the target code generated by the encoder unit. Execution of the target code on the target processor sets a stack pointer relevant to a head of the stack data structure, adjusts the stack pointer with reference to the register window movement information derived by the decoder unit; and accesses the entries in the stack data structure with reference to the stack pointer combined with a displacement determined from each of the windowed subject register references derived by the decoder unit.

In another exemplary aspect of the present invention there is provided a method of adapting a computing system to support a register window architecture. The method includes decoding subject code executable by a subject processor of a register window based subject computing architecture wherein a register window is positioned to reveal a selected subset of subject registers from a windowed register file, including identifying a windowed subject register reference from an instruction in the subject code, where said windowed subject register reference comprises a reference to one of said subject registers in the register window and deriving a register window movement information from an instruction in the subject code for causing a movement of the register window; providing a stack data structure in a memory of the computing system where the stack data structure is arranged to store a plurality of entries, and setting a stack pointer indicating a head of the stack data structure in the memory; converting the subject code into target code and executing the target code on a target processor of the computing system; adjusting the stack pointer with reference to the identified register window movement information; and accessing at least one of the entries in the stack data structure, with reference to the stack pointer in combination with a displacement determined from the windowed subject register reference.

In still another exemplary aspect of the present invention there is provided a computer readable storage medium having recorded thereon computer implementable instructions which when executed adapt a computing system to support a register window architecture, wherein the computer readable storage medium comprises: a code unit arranged to decode subject code executable by a subject processor of a register window based subject computing architecture wherein a current register window is positioned to reveal a selected subset of subject registers from a windowed register file, including identifying a windowed subject register reference from an instruction in the subject code, where said windowed subject register reference comprises a reference to one of said subject registers in the register window; and deriving a register window movement information from an instruction in the subject code for causing a movement of the register window; a code unit arranged to provide a stack data structure in a memory of the computing system arranged to store a plurality of entries, and to set a stack pointer indicating a head of the stack data structure in the memory; and a code unit arranged to convert the subject code into target code and to cause execution of the target code on a processor of the computing system to adjust the stack pointer with reference to the identified register window movement information and to access at least one of the entries in the stack data structure with reference to the adjusted stack pointer in combination with a displacement determined from the windowed subject register reference.

The exemplary embodiments of the present invention concern a mechanism which adapts a computing system to support a register window architecture, which is particularly applicable when converting from subject code for a subject processor of a subject computing system into target code executed instead by a target processor on a target computing system. The mechanism provides a stack data structure (the "SR stack") in the memory of the target computing system. The SR stack has a plurality of frames. Each frame on the SR stack stores a set of entries corresponding to the windowed subset of subject registers of the register window as addressed by the subject code. The SR stack is then accessed by the target code executing on the target computing architecture. The SR stack is able to store a large plurality of such frames and avoids expensive overhead such as modelling automatic spill and fill operations from the windowed register file of the subject architecture.

In one exemplary embodiment, a computing system having only sixteen working registers is adapted to support a register window architecture representing a windowed register file reliant upon tens or even hundreds of hardware registers. Further, the exemplary embodiments allow efficient operation of the target computing system, particularly in terms of processing speed, even when the system is adapted to support the register window architecture.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 7 is a table to further illustrate an example embodiment of the register window emulation mechanism of FIGS. 5 & 6;

FIGS. 8A and 8B are tables to further illustrate another example embodiment of the register window emulation mechanism of FIGS. 5 & 6;

DETAILED DESCRIPTION OF EXEMPLARY EMBODIMENTS

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

Figure 3:
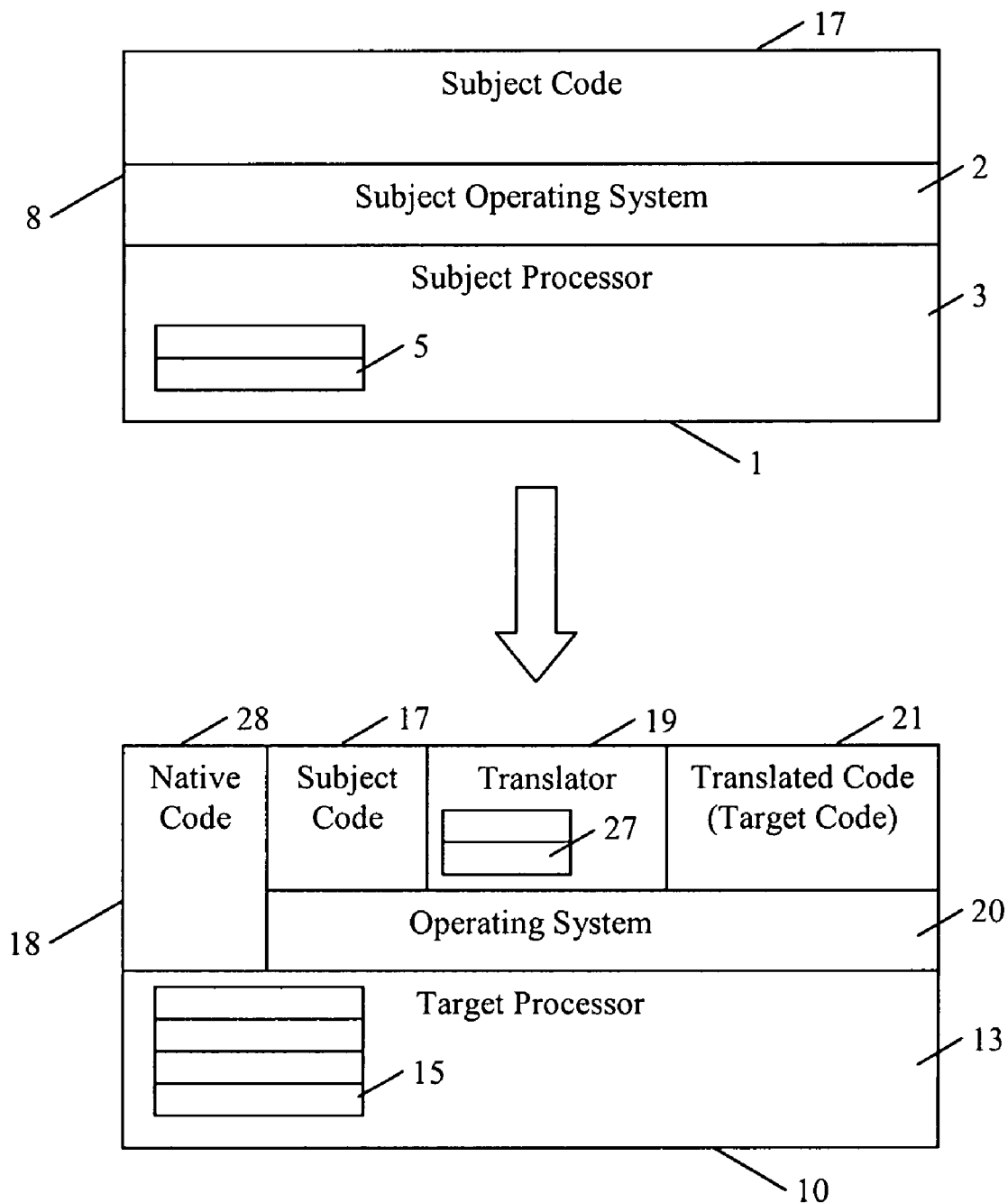
FIG. 3 is a block diagram illustrative of an apparatus as employed by exemplary embodiments of the invention.

Referring to FIG. 3, a subject program 17 is intended to execute on a subject computing platform 1 having a subject processor 3. Here, the subject computing platform 1 can by any form of electronic device which relies upon computing operations in the subject processor 3 to operate the device. However, a target computing platform 10 is instead used to execute the subject program 17, through a translator unit 19 which performs program code conversion. Here, the translator unit 19 converts the subject code 17 into target code 21, such that the target code 21 is then capable of being executed by the target computing platform 10.

As will be familiar to those skilled in the art, the subject processor 3 has a set of subject registers 5. A subject memory 8 holds, inter alia, the subject code 17 and a subject operating system 2. Similarly, the example target computing platform 10 in FIG. 3 comprises a target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer.

In one embodiment, the translator code 19 is an emulator to translate subject code of a subject instruction set architecture (ISA) into translated target code of another ISA, with or without optimisations (often known as a "this-to-that" translator). In another embodiment, the translator 19 functions to translate subject code into target code, each of the same ISA, by performing program code optimisations (known as a "this to this" translator or an "accelerator").

The translator code 19 is suitably a compiled version of source code implementing the translator, and runs in conjunction with the operating system 20 on the target processor 13. It will be appreciated that the structure illustrated in FIG. 3 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 3, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor under consideration. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level. Execution of the target code 21 performs the work expected of the subject code 17 and also updates the emulated model of the subject processor 3, such that the translator 19 is able to determine an emulated execution context (the subject state) and, in response, correctly control the flow of execution to dynamically select, translate and execute appropriate blocks of the subject program as target code.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator 19 may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated ("planted") based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of register definitions which correspond to specific features of the subject architecture upon which the subject program 17 is intended to run. For example, there is a unique register definition for each physical register on the subject architecture (i.e., the subject registers 5 of FIG. 3). As such, register definitions in the translator may be implemented as a C++ object which contains a reference to an IR node object (i.e., an IR tree). The aggregate of all IR trees referred to by the set of register definitions is referred to as the working IR forest ("forest" because it contains multiple abstract register roots, each of which refers to an IR tree). These IR trees and other processes suitably form part of the translator 19.

FIG. 3 further shows native code 28 in the memory 18 of the target architecture 10. There is a distinction between the target code 21, which results from the run-time translation of the subject code 17, and the native code 28, which is written or compiled directly for the target architecture. In some embodiments, a native binding is implemented by the translator 19 when it detects that the subject program's flow of control enters a section of subject code 17, such as a subject library, for which a native version of the subject code exists. Rather than translating the subject code, the translator 19 instead causes the equivalent native code 28 to be executed on the target processor 13. In example embodiments, the translator 19 binds generated target code 21 to the native code 28 using a defined interface, such as native code or target code call stubs, as discussed in more detail in published PCT application WO2005/008478 which is incorporated herein by reference.

Figure 4:
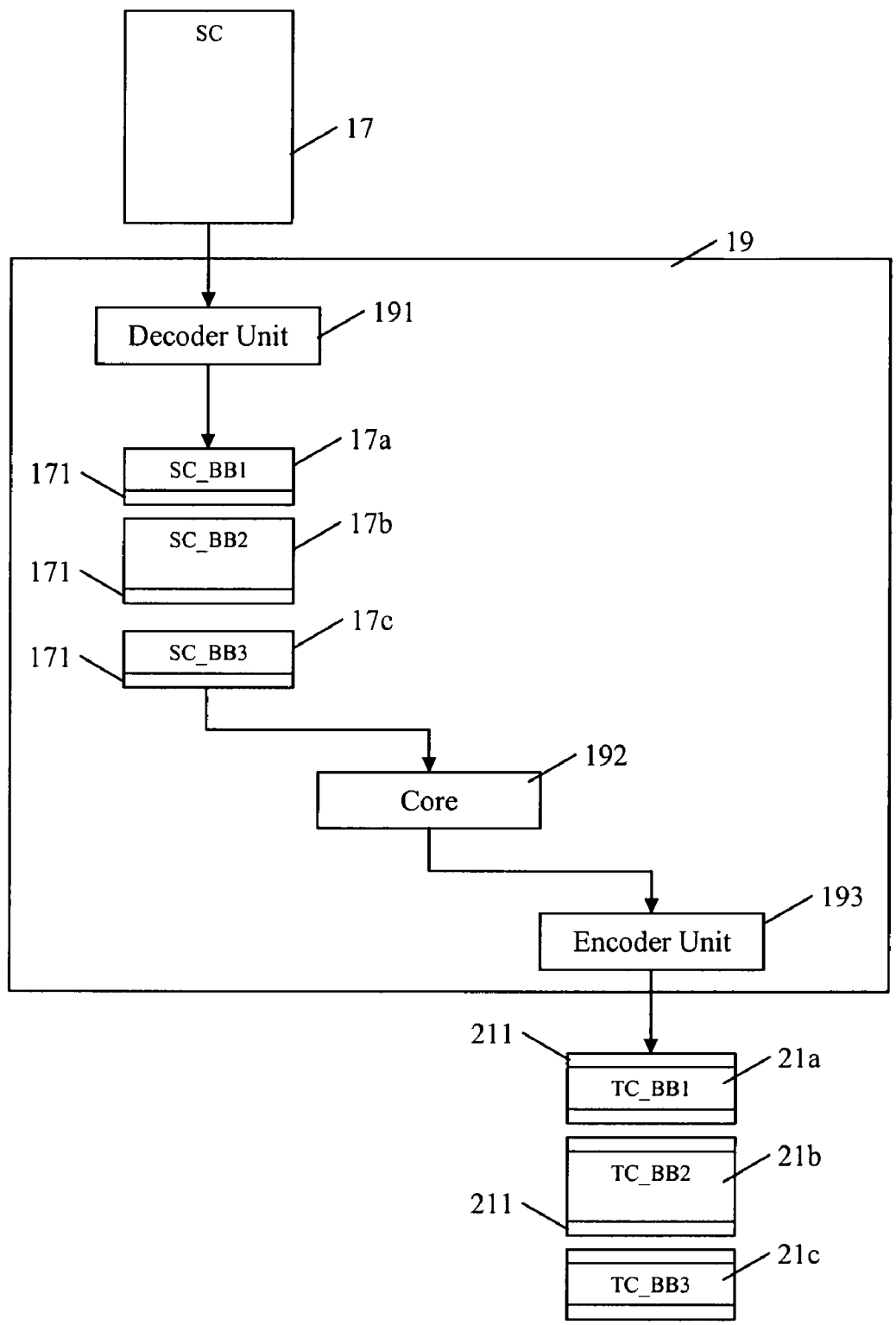
FIG. 4 is a schematic overview of a program code conversion process as employed by exemplary embodiments of the present invention.

FIG. 4 illustrates the translator 19 in more detail when running on the target computing platform 10. As discussed above, the front end of the translator 19 includes a decoder unit 191 which decodes a currently needed section of the subject program 17 to provide a plurality of subject code blocks 17a, 17b, 17c (which usually each contain one basic block of subject code), and may also provide decoder information 171 in relation to each subject block and the subject instructions contained therein which will assist the later operations of the translator 19. In some embodiments, an IR unit in the core 192 of the translator 19 produces an intermediate representation (IR) from the decoded subject instructions, and optimisations are opportunely performed in relation to the intermediate representation. An encoder 193 as part of the back end of the translator 19 generates (plants) target code 21 executable by the target processor 13. In this simplistic example, three target code blocks 21a-21c are generated to perform work on the target platform 10 equivalent to executing the subject code blocks 17a-17c on the subject platform 1. Also, the encoder 193 may generate header code and/or footer code 211 for some or all of the target code blocks 21a-21c which performs functions such as setting the environment in which the target block will operate and passing control back to the translator 19 where appropriate. In one embodiment, the translator 19 maintains a record of the subject code blocks 17a-17c for which target code 21a-21c has already been generated. Thus, when the same block of subject code is again encountered later in the program, then the previously generated target code can be fetched and reused. However, other embodiments of the invention may use other specific mechanisms to dynamically match the subject code with the generated target code.

In FIG. 4, the subject code 17 is suitably an application program which is converted by the translator 19 to run on the target system. As general examples, the application program 17 is a complex program such as a web server, a digital content server (e.g. a streaming audio or streaming video server), a word processor, a spreadsheet editor, a graphics image editing tool, or a database application, amongst many others. However, in other examples, the subject code 17 is any sort of program which enables the computing system to perform useful work and control operations of an electronic device. The target computing platform 10 is often required to run many such programs simultaneously, in addition to other tasks such as those associated with the operating system 20 and the translator 19.

In the example embodiments, the subject code 17 takes the form of a binary executable which has been created (e.g. compiled) specific to the subject architecture 1. There is no opportunity for human intervention or review of the subject code 17. Instead, the target computing platform 10, through the translator 19, automatically converts the subject code 17 into the target code 21 as a binary executed on the target computing platform 10. Thus, in the exemplary embodiment, the translator 19 is a binary translator that converts the subject code 17 as a binary executable of the subject ISA into the target code as a binary executable of the target ISA. Further, translator 19 is a dynamic binary translator that interleaves the translation with execution of blocks of the target code 21.

Figure 5:
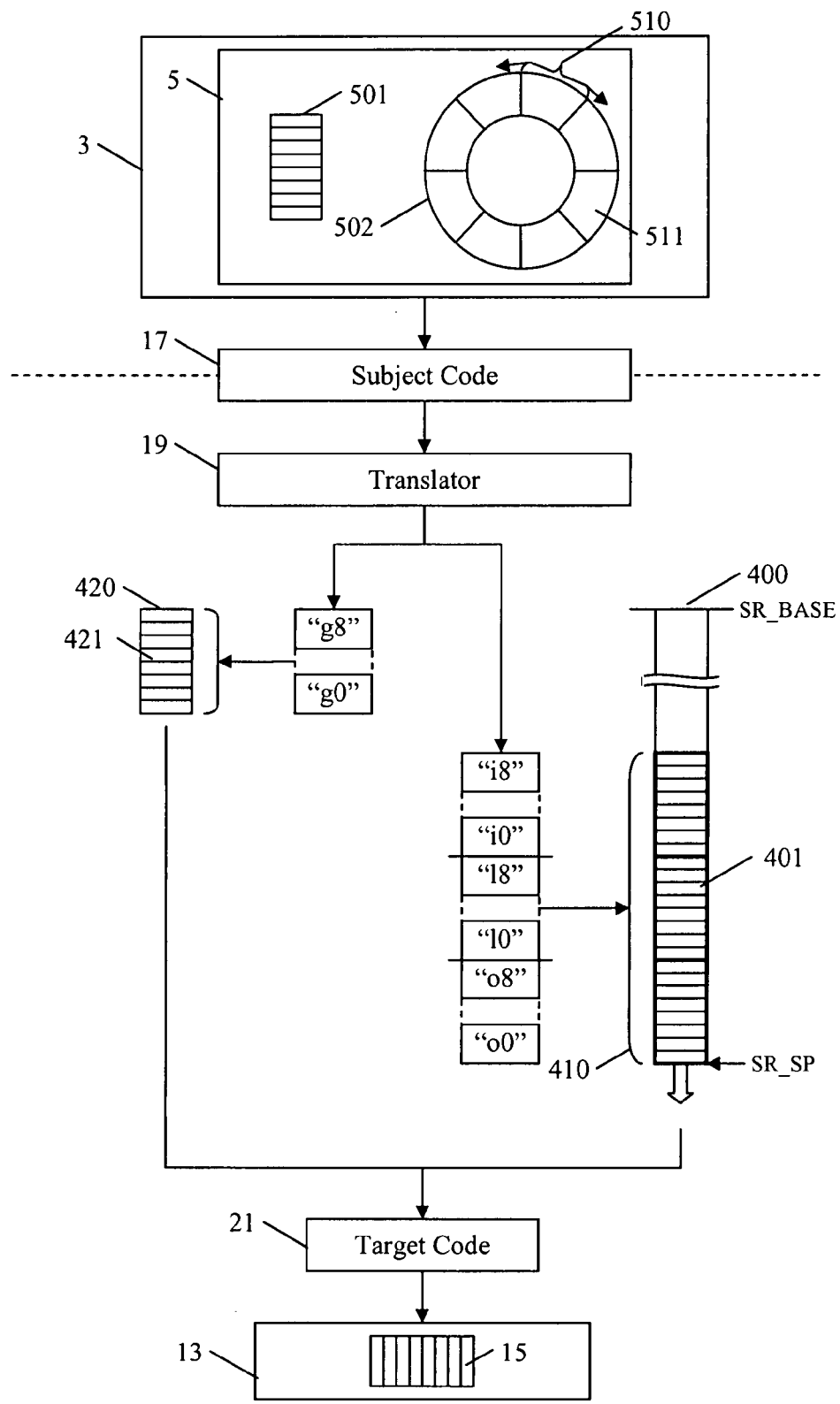
FIG. 5 is a schematic overview of a register window emulation mechanism as provided by exemplary embodiments of the present invention.

FIG. 5 illustrates a mechanism as employed by embodiments of the present invention to emulate, in the target computing platform 10, key components of a subject processor 3 having a register window architecture. As discussed above, emulating these components of the subject processor enables the translator 19 to generate target code 21 which faithfully models the expected behaviour of the subject code 17. In the following example embodiments, the architecture of target processor 13 does not provide register windows, or uses a different form of register windows compared with the subject processor 13. Hence, the subject code 17 cannot run on the target processor 13. As a practical example, the translator 19 is arranged to translate subject code intended for execution on a v9 SPARC processor having at least 64, and more typically several hundred, 64-bit general-purpose hardware registers to run as target code on a 64-bit x86-type processor having just sixteen general-purpose hardware registers. As illustrated by this example, the subject processor 3 and the target processor 13 are sometimes fundamentally incompatible in terms of the number and type of registers available, and the way that the registers are structured in each processor.

Figure 1:
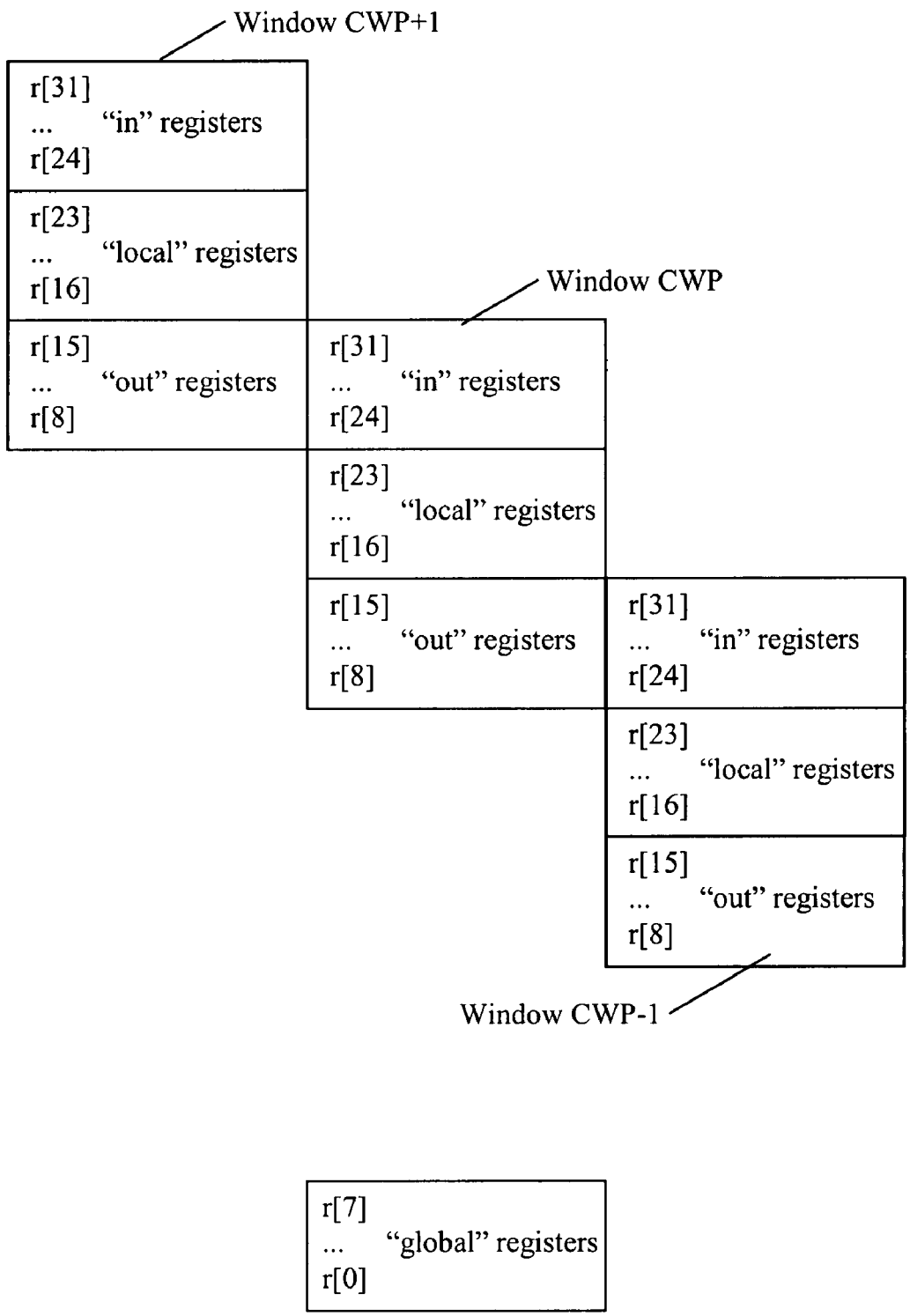
FIG. 1 illustrates part of a register file in an example subject computing architecture of the related art.
Figure 2:
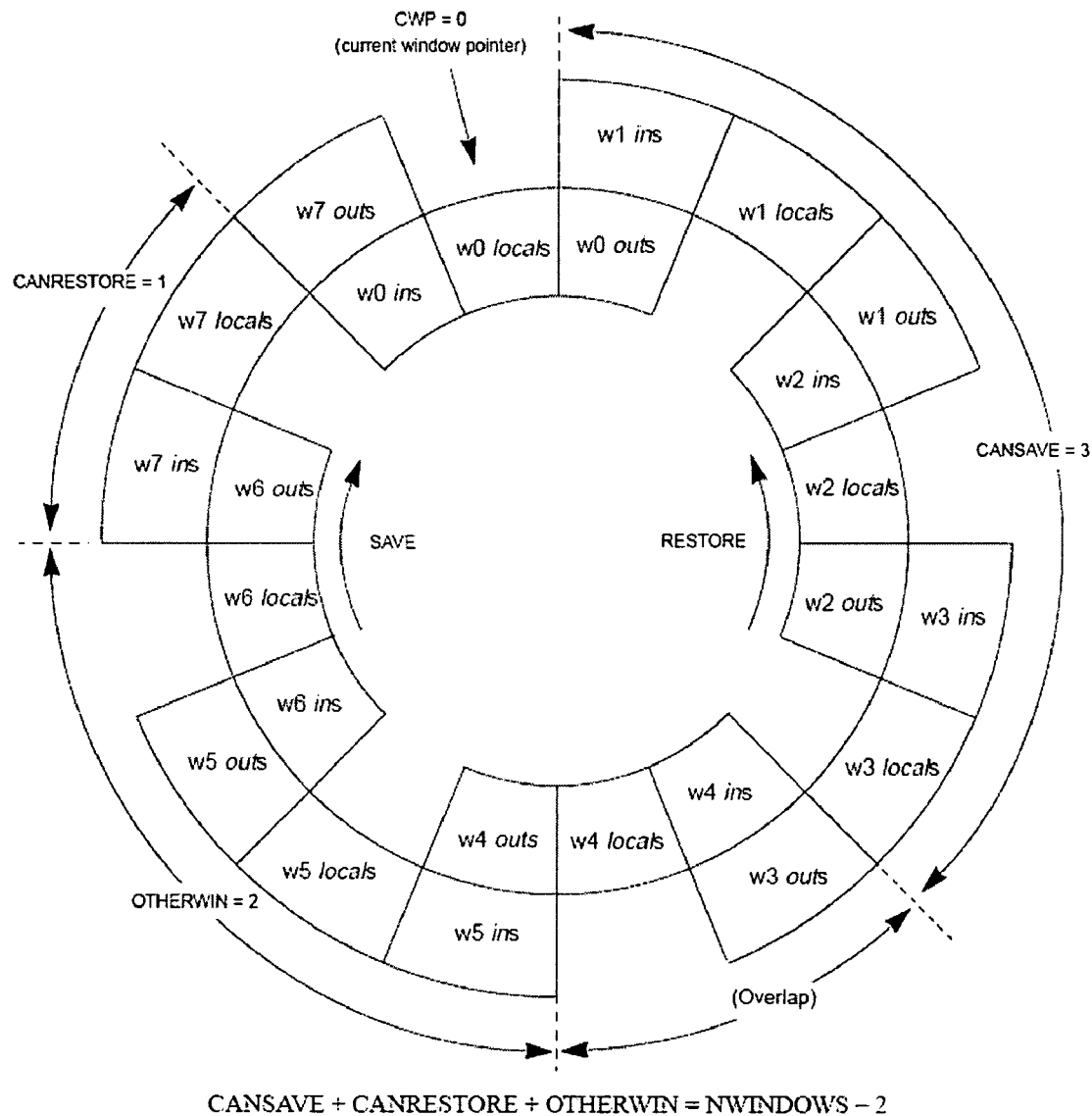
FIG. 2 further illustrates the register file in the example subject computing architecture of the related art.

Although the general construction and operation of the subject processor 3 will be familiar to the skilled person, a brief review is provided here in order to illustrate and discuss those components of the subject processor that are emulated by the target system. In the example embodiments discussed herein, the subject processor 3 employs a register window arrangement according to the example v9 SPARC architecture which has been discussed above generally with reference to FIGS. 1 and 2. In this case, the register window positions are overlapped and have a rotating configuration. However, it will be appreciated that embodiments of the invention may also be implemented for a register window architecture having other specific configurations, such as non-overlapping and/or non-rotating configurations. Some related art descriptions of this register window architecture refer to a plurality of register windows, only one of which is the current window (i.e. there are many windows each having a fixed position and only one of which is open at any one time). For consistency, the following description considers a single current window which is moved to different register window positions, but the skilled person will readily understand that the invention is equally applicable to architectures defined in terms of multiple fixed windows.

FIG. 5 shows the large plurality of general-purpose hardware registers 5 that are provided in the subject processor 3. For clarity and ease of explanation, the control/status registers and the many other parts of the subject processor 3 are not shown. These subject registers 5 include a small set of globally-visible registers 501 ("global subject registers") which are static and are visible to all sections of the subject code 17, and a large file of registers 502 ("windowed subject registers") which are windowed such that only a subset of this register file is visible to a currently executing portion of the subject code 17 as the current "register window" 510 which moves to one of a plurality of register window positions 511. Thus, only the subset of windowed subject registers 502 which lie under the current position of the register window 510 are accessible by the executing code at any one time.

Although a large number of registers are provided in the subject hardware, the subject code 17 is only able to address thirty-two visible general purpose registers at any one time, namely the eight global subject registers 501 (g0-g7) and the twenty-four register window 510 into the windowed subject registers 502 (i0-i7, l0-l7, o0-o7). Hence, the subject code is written with reference to this visible set of thirty-two register names.

Turning now to consider the target computing platform 10, the subject code 17 is provided such as by loading the subject code 17 into an available area in the memory 18 of the target system and, block by block, the subject code 17 is converted and executed as target code 21. As discussed above, when the translator 19 first encounters a block of subject code, the decoder unit 191 decodes the subject instructions. This decoding process includes identifying references within the subject code instructions to the general purpose subject registers of the subject architecture, including in particular references to the windowed subject registers 502 and the global subject registers 501. Secondly, subject code instructions are identified which cause SAVE and RESTORE type movements of the current register window to a new position. Here, the instruction set architecture for the example v9 SPARC hardware includes at least "save" and "restore" instructions which, on the subject platform, would cause the current register window 510 to move to another one of the positions 511. The register references and the register window movement information obtained by the decoder 191 are passed to the core 192 and are used in the encoder 193 to generate the target code 21.

At an initialisation stage, the translator 19 provides various memory structures which later will be used to emulate the subject processor. In particular, the translator 19 provides the abstract register bank 27 as discussed above, namely a data structure used to store values which would have been held in the registers 5 of the subject processor 3 including the global subject registers 501 and the windowed subject registers 502. Here, a memory region 420 is defined in the target memory 18 having a set of eight static locations 421 to form a static part of the abstract register bank 27 relating to the eight global subject registers 501. Where references to the global subject registers 501 are identified in the subject code instructions decoded by the decoder unit 191, the equivalent target code instructions are generated with appropriate references to these static locations 421 in the memory region 420. That is, the data values representing the contents of these subject global registers 501 are used by the target code 21, most commonly by loading data from the static locations 421 into the working registers 15 of the target processor 13, and then storing results back to these memory locations 421 as appropriate during execution of the target code. In this way, the target code 21 emulates the behaviour of those instructions of the subject code 17 which rely on the global subject registers 501.

The windowed subject registers 502 behave in a dynamic windowed configuration as discussed above and hence a separate mechanism is now provided in the target platform to emulate these subject registers. As shown in FIG. 5, to implement this register window mechanism the translator 19 provides a stack data structure within the memory 18 of the target platform 10, which will referred to below as the "SR stack" 400. As will be familiar to persons skilled in the art, a stack is a LIFO (last-in-first-out) type of memory structure that is created and managed efficiently in most commonly available computing architectures. Typically, a stack is located in memory at a given base address (start address) and grows downwards (or upwards) in memory as data is added to or removed from the stack. The current position of the top (head) of the stack is determined by reference to a stack pointer and the stack pointer is regularly updated to account for the memory locations which are consumed as data is pushed onto the stack and conversely which are released as data is popped from the stack. Commonly, data on the stack is manipulable by addressing memory relative to the stack pointer. In the following examples, the SR stack 400 grows downwardly (i.e. using progressively decreasing memory addresses) from a given base address SR_BASE in the target memory 18 and a stack pointer SR_SP is used to determine the current head of the SR stack.

The SR stack 400 is used to store data values each representing the content of one of the windowed subject registers 502 as referenced by the subject code 17. That is, decoding the subject code 17 reveals the windowed subject registers 502 which are accessed by the subject code 17 during execution, and the data values used by the subject code are now instead stored as entries 401 in the SR stack 400. The target code 21 is generated to store these data values on the SR stack 400 in the target memory 18, load the data values into the working registers 15 of the target processor 13 as needed by the target code 21, and store the results back to the SR stack 400 as appropriate during execution of the target code. The SR stack 400 thus forms part of the abstract register bank 27 to emulate the windowed subject registers 502 and enables the target code 21 to emulate execution of the subject code instructions which rely on the windowed subject registers 502.

In the example embodiment as illustrated in FIG. 5, the SR stack 400 is divided into a plurality of frames 410, where each frame 410 contains a set of the data entries 401. In this example, the addressable set of twenty-four windowed subject registers 502 are referred to as "i0"-"i7", "l0"-"l7", "o0"-"o7" (or equivalently as r[8] to r[31]) by the subject code 17. Hence, register definitions and register references in the subject code (which are collectively referred to herein as "register references") are, from the viewpoint of the subject code 17, expressed in terms of this addressable set of register names. In the emulation mechanism discussed herein, those data values required by the subject code 17 to lie in the subject registers 502 are instead stored in one frame 410 of twenty-four entries 401 on the SR stack 400.

Secondly, where in the subject processor 3 the subject code 17 would cause the current register window 510 to move to a new position 511, then in the present emulation mechanism a new frame 410 of entries 401 is provided on the SR stack 400. Due to the overlapping nature of the windowed subject registers 502, this example embodiment provides sixteen new entries 401 on the SR stack 400 for each new frame 410, whilst eight older entries (corresponding to "o0"-"o8" of the previous frame 410) now give the data values for the "i0"-"i8" register references of the current frame.

Figure 6:
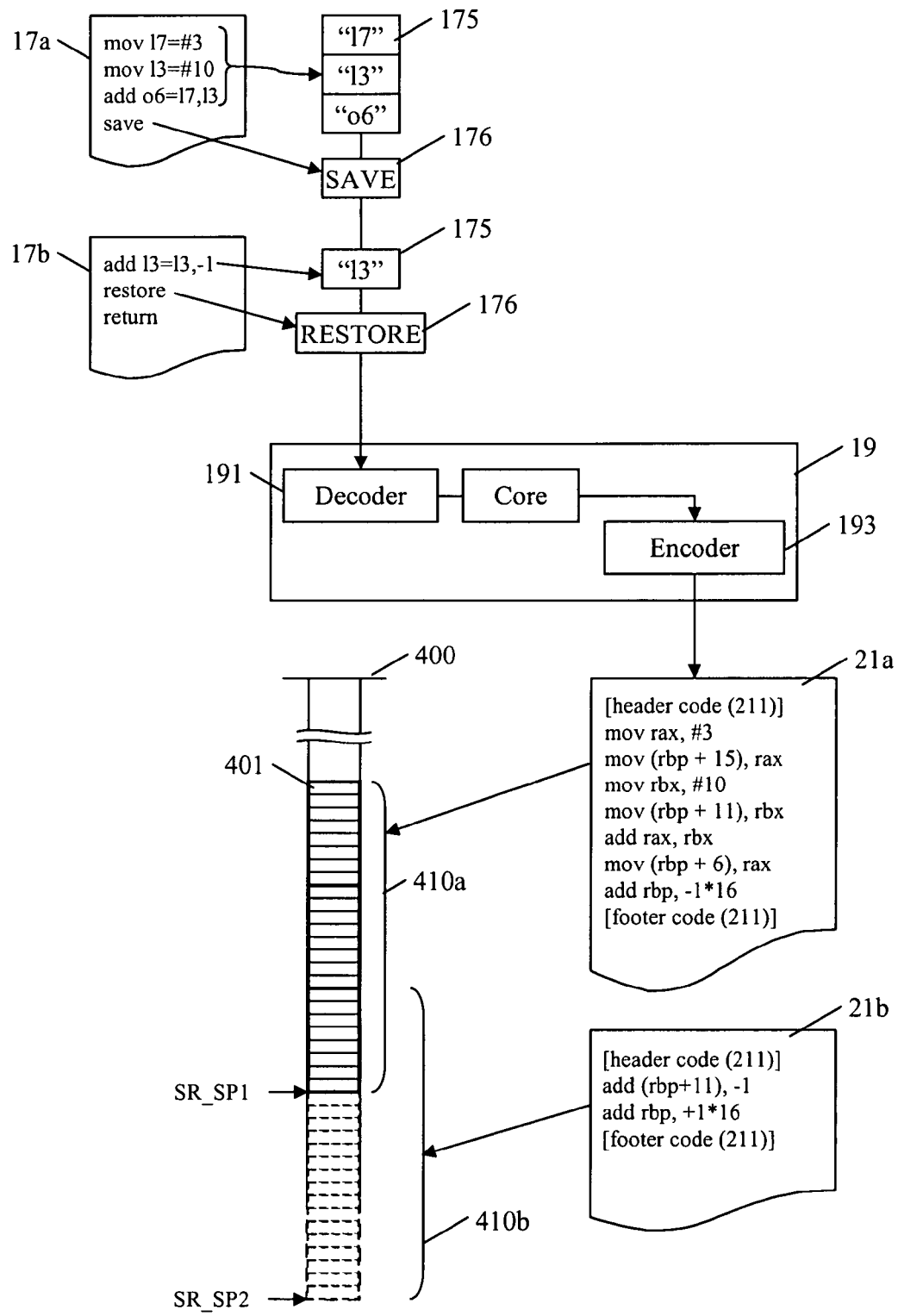
FIG. 6 is a more detailed schematic diagram of the register window emulation mechanism of FIG. 5.

FIG. 6 is a more detailed schematic view of the register window emulation mechanism discussed herein to illustrate an example mechanism for SR stack addressing. In the discussion below, example pseudo code instructions are provided as sections of subject code 17a, 17b and target code 21a, 21b and the instructions have been shown here as a simplified assembler-type pseudo code for clarity. The subject code examples are based generally on the SPARC v9 ISA (i.e. operation source, destination), but details such as delay slots and certain instruction arguments have been omitted for clarity. Similarly, the target code examples are shown as an assembler-type pseudo code which is based generally on the Linux assembly language using Intel syntax (i.e. operation destination, source). Of course, the example embodiments of the invention relating to a dynamic binary translator will receive the subject code 17 as binary machine code and generate target code as binary machine code, but the assembler-type pseudo code has been provided for ease of explanation. The example pseudo code shown in FIG. 6 will also be discussed in more detail below referring to FIGS. 7 & 8.

As shown in FIG. 6, the decoder unit 191 of the translator 19 decodes the instructions in the first and second subject code blocks 17a, 17b. Conveniently, this first example embodiment divides the subject code into the first and second blocks according to the position of the "save" and "restore" subject instructions. In practical embodiments, each block of subject code 17a, 17b will typically contain around ten instructions, but sometimes will contain up to around one hundred instructions.

The decoder 191 identifies the subject code references 175 to the windowed subject registers 502, and derives the register window movement information 176. In this example pseudo code, the first subject block 17a includes two "mov" instructions and one "add" which contain the references 175 to the windowed subject register "l7", "l3" and "o6" (i.e. local3, local7 and output6). Concerning the register window movement information 176, the "save" instruction here is identified as causing a SAVE type movement. Similarly, the second code section 17b is decoded to identify another reference 175 to "l3" (local3), and a "restore" to induce a RESTORE type register window movement 176. The "return" in this example pseudo code returns to some other caller section of subject code not shown in the diagram.

The target code 21 generated by the translator 19 in this case is illustrated by the target code blocks 21a and 21b. Here, the translator 19 generates the target code instructions to address relevant entries 401 on the SR stack 400, based at least in part on the identified subject register references.

In this first embodiment, the relevant SR stack entries 401 are addressed by considering the identified windowed subject register references 175, and with respect to the stack pointer SR_SP. Conveniently, the stack pointer SR_SP is updated at the end of each target block in response to the identified register window movement information 176 found at the end of each subject block. That is, the target code 21 is generated to update the SR stack pointer SR_SP to track the current position of the head of the SR stack in response to the SAVE and RESTORE register window movement information 176 obtained by the decoder 191.

Here, the generated target code 21 contains target instructions which cause the SR stack pointer SR_SP to be updated to move forward down the SR stack 400 by sixteen 64-bit entries 401 for each identified SAVE type movement, or roll back by sixteen entries for each identified RESTORE type movement. Here, the stack pointer is updated by sixteen entries rather than a full frame of twenty-four entries due to the overlapping of the entries representing "i"s (inputs) and "o"s (outputs) within each frame 410. As illustrated by the example in FIG. 6, SR_SP is set to a first value "SR_SP1" for the first target code block 21a relevant to a first frame 410a and is updated to a second value "SR_SP2" such that the second target code block 21b refers instead to the entries 401 in a second frame 410b.

As also shown in FIG. 6, in this first embodiment the required SR stack entries 401 are found in the current frame 410 of twenty-four entries 401 located at the head of the SR stack 400 as referenced by the current value of the stack pointer SR_SP. Here, each register reference 175 determines a predetermined displacement relevant to the current value of the stack pointer SR_SP. As a simplified example, by taking the entry for "o0" as having displacement of 0 (i.e. the stack pointer SR_SP refers to "o0" as the first entry on the stack), then the entries for "o1" and "o2" have displacements of +1 and +2 64-bit words, respectively, and so on up to the entry for "i7" at +23 64-bit words. Here, the target code 21 calculates the address of the required entry on the stack by combining the current value of the stack pointer with the required displacement.

Conveniently, one of the target registers 13 is chosen to hold the stack pointer SR_SP and is loaded with the current value of the stack pointer when passing context to the target code. On the example 64-bit x86 target architecture, the stack pointer is conveniently loaded into one of the temporary registers such as rbp. That is, as one option, the stack pointer SR_SP is loaded into the target register rbp in a run loop of the translator 19 prior to calling the illustrated first section of target code 21a. Alternatively, rbp is conveniently loaded as part of the header code 211 (shown in FIG. 4). Thus, the stack pointer SR_SP is then available for use in the sections of target code 21a, 21b from the register rbp. An example instruction to perform this operation is shown below, where "fs:SR_SP" is a reference to a memory location which stores the stack pointer during context switches, as part of the subject state held by the translator 19:

mov rbp, (fs:SR_SP),

The following example shows the calculation of the displacement on the SR stack where, in the subject code, one of the subject global subject registers "g1" is loaded into the local windowed subject register "l5" (local5). Here, the "l5" entry is located at a displacement of "+13", i.e. thirteen 64-bit words (which is conveniently expressed as 13*8=104 8-bit bytes in some architectures having addressing in 8-bit bytes).

In the target code, we can assume that the value for "g1" has already been loaded from the memory region 420 into an available target register rax:

| Subject code | Target code |
|---|---|
| mov g1,l5 | mov (rbp+13), rax |

In response to the identified SAVE movement 176, the current stack pointer value SR_SP now held in rbx is advanced by sixteen 64-bit entries on the SR stack 400. This will either add sixteen new entries 401 to the SR stack, or will move the current frame 410 forward to a previously occupied position and thus now reveal the data values stored in these memory locations. Secondly, it is useful at this point to also update the version of SR_SP held in memory at fs:SR_SP, although this can be done separately.

The stack pointer SR_SP is advanced downwardly in memory (in this example by sixteen 64-bit words) in response to each SAVE type movement information 176 such as with the target instructions:

add rbp, −16 mov (fs:SR_SP), rbp

Conversely, the stack pointer SR_SP is retarded upwardly in memory in response to each RESTORE type movement information 176 to then allow the specified displacements to refer to a previously encountered frame 410 of entries 401 on the SR stack 400, such as with the target instructions:

add rbp, +16 mov (fs:SR_SP), rbp

FIG. 7 is a table illustrating the above example embodiment of FIG. 6 in more detail. That is, FIG. 7 shows the subject code blocks 17a, 17b as discussed above. Also, FIG. 7 shows the identified subject register references 175 identified by decoding the subject code instructions, and shows the associated displacements 177 for each identified reference 175. Further, as shown in FIG. 7, decoding the subject code 17 derives the identified register window movement information 176. Finally, FIG. 7 shows the target code blocks 21a, 21b which are generated from the subject code instructions, with reference to the register references 175 and the register window movement information 176.

As shown in FIG. 7, the first target code block 21a begins with header code 211 which, in this example, includes instructions (not shown) that load the stack pointer SR_SP into the temporary target register rbp. At this point, we can assume that rbp holds the value "SP_SR1" and so refers to frame 410a of FIG. 6. Next, the target registers rax and rbx are loaded with the constants "10" and "3", and then these values are also stored into the referenced entries on the SR stack 400, with respect to the displacements 177 derived from the register references 175. Thus, the relevant entries on the SR stack 400 now hold the data values expected by the subject code in the referenced registers "l7" and "l3". These target registers rax and rbx are then used perform work equivalent to the example "add" subject instruction, and the result stored to the entry 401 relevant to the "o6" reference. The "save" subject instruction in this embodiment terminates the first subject block 17a. Also, in response to the register window movement information 176 derived from this "save" the target code 21a is generated to amend the stack pointer SR_SP held in rbp to advance by sixteen entries on the SR stack 400, so that SR_SP now has the value "SR_SP2" and refers to frame 410b in FIG. 6. The footer code 211 in this first target block 21a now determines a next action, such as passing control back to the translator 19 to select a next block of subject code to execute as translated target code, or to pass control directly to a next block of already generated target code. In this example, the footer code 211 passes execution control directly to the second target code block 21b, without returning to the translator 19.

The header code 211 in the second target code block 21b suitably prepares context for this block. In most cases this includes including loading SP_SP into rbp from the memory at fs:SR_SP, although in this example a target code optimisation would allow the value already in rbp simply to be carried forward from block 21a. Then, the target code performs the work of the subject "add" instruction from subject block 17b. Note that, due to the updated value of SR_SP in rbp, the register reference to "l3" (local3) does not resolve to the same entry 401 in the SR stack 400 as in the first subject code block 17a. That is, in subject block 17a the reference to "l3" resolved to an entry in frame 410a, whereas the reference to "l3" in subject block 17b now instead resolves to an entry in frame 410b. In this way, the SR stack 400 emulates the expected behaviour of the register window in the subject processor. Finally, in response to the register window movement information 176 from the final "restore" in subject block 17b, the target code 21b has been generated to update the value of SR_SP in rbp to retard the stack pointer by sixteen entries, whereby the stack pointer is now again referring to frame 410a of FIG. 6. Also, the subject "restore" instruction acts to select the termination point of this second subject block 17b. In most cases, the "restore" causes the translator to terminate the subject block 17b. However, in this example, the subject block is actually terminated at the "return" immediately following the "restore". At this point it is appropriate to save the updated stack pointer SR_SP back from rbp to fs:SR_SP, and the footer code 211 now determines a next action, such as in this case returning execution control to the translator 19, which may in turn then return control to the subject code (not shown) that called the first subject block 17a as "func1" to continue execution of the subject program.

FIG. 8 is another table similar to the above example of FIGS. 6 and 7, to illustrate a second example mechanism for addressing the SR stack 400.

The decoder unit 191 of the translator 19 identifies the windowed subject register references 175 and the register window movement information 176 as discussed above. Further, the identified register window movements 176 are used to derive a frame offset 178 which is expressed in the target code 21 as a frame offset from the SR_SP stack pointer. Then, each of the register references 175 provide the displacement 177 from this frame offset 178 to address a relevant entry 401 in the SR stack 400. Hence, the stack pointer SR_SP may now remain constant throughout the target code block 21a, even though two or more frames 410 of entries 401 are under consideration during the block. The second embodiment shown in FIG. 8 in particular allows the translator to inline leaf functions within a single block of target code, where a leaf function is a function which does not itself call another function. The function is inlined by treating both the caller and the callee subject code instructions as a single block subject code 17a and creating therefrom a corresponding single block of target code 21a. In this simplified example of FIG. 8, there is no leaf function, but the operations discussed below are equally applicable for this purpose.

In a further example embodiment, where the decoder 191 detects that a section of subject code 17 contains more than a predetermined number of SAVEs or RESTOREs, then decoding of the block is stopped (broken) at that point, and a new block created with the frame offset returning to the default value ("f0"). That is, where a section of subject code contains greater than the permitted number of SAVE or RESTOREs, this section of subject code is subdivided into two or more smaller sections, by creating additional subject code blocks. This limitation is convenient to allow a break in an otherwise relatively lengthy block.

As shown in FIG. 8A, the identified register window movements 176 adjust a frame offset 178 up or down in SAVE and RESTORE directions from an assumed starting position. Conveniently the frame offset 178 is set to "0" at the start of each decoded block and is adjusted by one count to "−1", "−2" etc. for each consecutive SAVE movement. Conversely, the frame offset is increased by one count for each identified RESTORE type movement. Thus, the frame offset provides a current cumulative offset from the default starting position based on the identified register window movement information 176 encountered during that block. For example, from the default of "0", a SAVE adjusts the frame offset 178 to "−1". A second SAVE then adjusts the offset to "−2". However, a RESTORE now adjusts the offset back to "−1", a second RESTORE adjusts the offset back to "0", and a further RESTORE adjusts the offset now to "+1", and so on. The table in FIG. 8 shows the identified register references 175 and the identified register window movements 176. Also, the table shows the displacements 177 and the frame offsets 178 derived therefrom. Further, the table shows example target code 21 which combines together the frame offset 178 and the displacements 177 to address individual entries 401 lying in various different frames 410 on the SR stack 400. That is, the current offset 178 and the displacements 177 are used by the core 192 and the encoder unit 193 when generating and planting the target code. The encoder 193 is thus able to plant target code 21 which simplifies addressing in the SR stack by allowing "base plus offset" type addressing.

As shown in FIG. 8A, the target code block 21a begins with header code 211 which, as in the previous example, suitably loads the stack pointer SR_SP into a target register rbp. In this example, it is assumed that the value in rbp refers to frame 410a of FIG. 6. Next, the target code performs work equivalent to the example "mov" and "add" subject instructions as discussed above. In response to the register window movement information 176 derived from the "save", the frame offset 178 is decreased by one count and the target code is generated to temporarily amend the stack pointer SR_SP held in rbp to advance by sixteen entries on the SR stack 400, so that SR_SP now refers to the subsequent frame 410b in FIG. 6. Note that the "save" subject instruction here does not terminate the subject block. That is, the overhead of header and footer code is not required. The target code in FIG. 8 now immediately performs the work of the second subject "add" instruction using rax. In response to the register window movement information 176 derived from the "restore", the target code has been generated to update the value of SR_SP in rbp according to the new offset 178 to retard the stack pointer by sixteen entries, whereby the stack pointer is now again referring to frame 410a of FIG. 6. Also, the final subject "restore" instruction acts to select the termination point of this subject block 17a. The footer 211 thus now saves the updated stack pointer SR_SP back from rbp to fs:SR_SP. As for FIG. 7 above, the "return" at the end of the subject block 17a may return execution control to the translator which may in turn then return to the subject code (not shown) that called the subject block 17a as "func1".

FIG. 8B shows a further optimisation in the SR addressing mechanism. Here, the offset 178 is combined with the displacement 177 prior to generating the target code, such that the work of temporarily adjusting the value of SR_SP in rbp is avoided. That is, the three target instructions "add", "mov" and "add" at the end of FIG. 8A are conveniently combined into a single "add" instruction as shown in FIG. 8B. The offset 178 and the displacement 177 are combined in this case by −16+11=−5 to give a combined adjustment of −5 from the original value of rbp. Here, identifying the register references 175 and associated displacements 177, together with the register window movement information 176 and the associated frame offsets 178, allows efficient optimised target code to be planted which both performs the work of the subject code and emulates the key components of the subject processor relevant to the operation of that subject code.

The addressing mechanism discussed above in FIG. 8 allows the translator 19 to provide a single block of target code which includes target instructions that emulate the effects of multiple "save" and/or "restore" instructions of the subject code within a single block of target code. It will be appreciated that this mechanism also allows the translator 19 to inline subject functions, and particularly leaf functions, into the target code. That is, the subject "call" and "return" instructions that are used to perform a procedure call involve the same SAVE and RESTORE type movements of the register window 510 and can now be achieved without requiring a function call in the target code.

Figure 9:
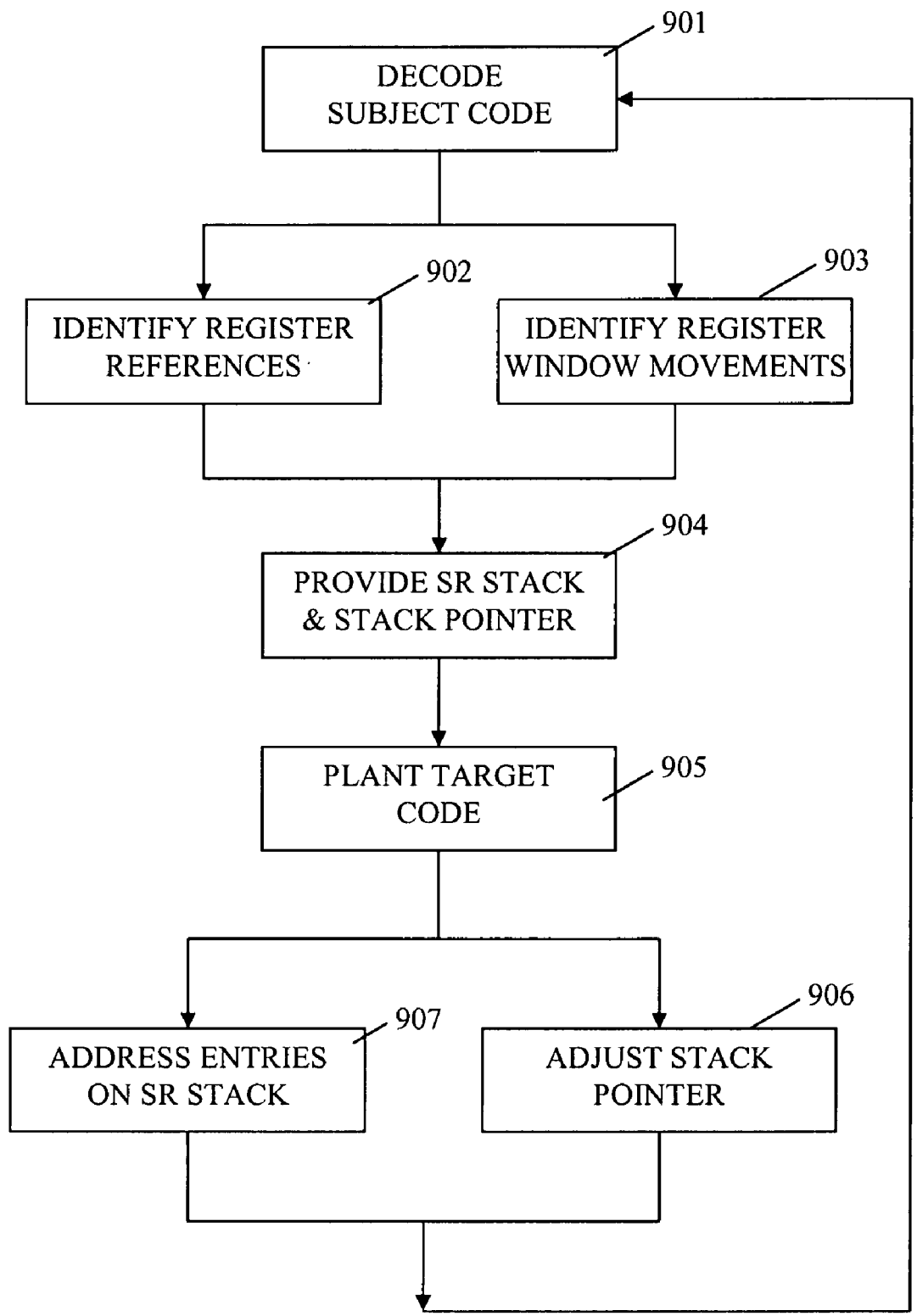
FIG. 9 is a schematic flow diagram illustrating a method to adapt a computer system to support a register window architecture according to the exemplary embodiments of the present invention.

FIG. 9 is a schematic flow diagram of a method of performing the register window emulation mechanism discussed herein. A block of the subject code 17 is selected and decoded at step 901. References 175 in this block of subject code 17 to the subject registers 5 of the subject processor 3 are identified at step 902. Most particularly, the references 175 relate to the file of windowed subject registers 502. Also, instructions 176 in the subject code 17 which cause movement of a register window 510 are identified at step 903. At step 904, the SR stack 400 is provided on the target computing platform 10 as discussed above, with reference to a stack pointer SR_SP.

At step 905, the target code 21 is generated with reference to the SR stack 400 and the stack pointer SR_SP. That is, each block of target code 21 is generated with target code instructions which store and retrieve data values as entries 401 on the SR stack 400. Here, at step 906, the target code derived from the identified register window movement information 176 adjusts the stack pointer SR_SP, either by immediately updating the stack pointer SR_SP to refer to the new head of the stack, or by adjusting the temporary frame offset 178. At step 907, the target code 21 derived from the identified register references 175 accesses the desired entries 401 within the frames 410 of the SR stack, using the associated displacements 176 from the adjusted stack pointer SR_SP.

Advantageously, the SR stack mechanism 400 is not limited as to the number of frames 401 which it can store simultaneously. Referring again to FIG. 5, it will be noted that this example hardware implementation of the subject processor 3 provides only eight register window position 511 and by definition the SPARC hardware is only able to provide a maximum of 32 register window position. Once each of the register window positions 511 contains valid data, any additional SAVE forces a spill operation to empty the windowed register file 502 to free new temporary working space. By contrast, the present emulated register window mechanism avoids the considerable overhead associated with detecting and performing the automatic spill and fill operations of the subject architecture. That is, the present register window mechanism is not bounded by such finite hardware limitations and the SR stack 400 instead expands as required to contain the necessary additional entries 401 for each SAVE. If the subject computing architecture comprises a maximum finite number n register window positions, and then the SR stack may have, as execution progress, a plurality m frames 410, where m and n are both positive integers and m is greater n. The SR stack 400 is relatively large and is not of a predetermined finite size. In most target computing platforms the memory 18 is sufficiently large that the SR stack 400 appears to the translator 19 as an infinite resource. Ultimately, the SR stack 400 is limited in size but in practice the theoretical maximum size of the stack far exceeds the needed size for any realistic implementation (e.g. 1 Kb per sixteen 64-bit entries), such that the SR stack may be treated as an infinite resource (i.e. many hundreds of frames 410 are easily stored by the SR stack 400).

Figure 10:
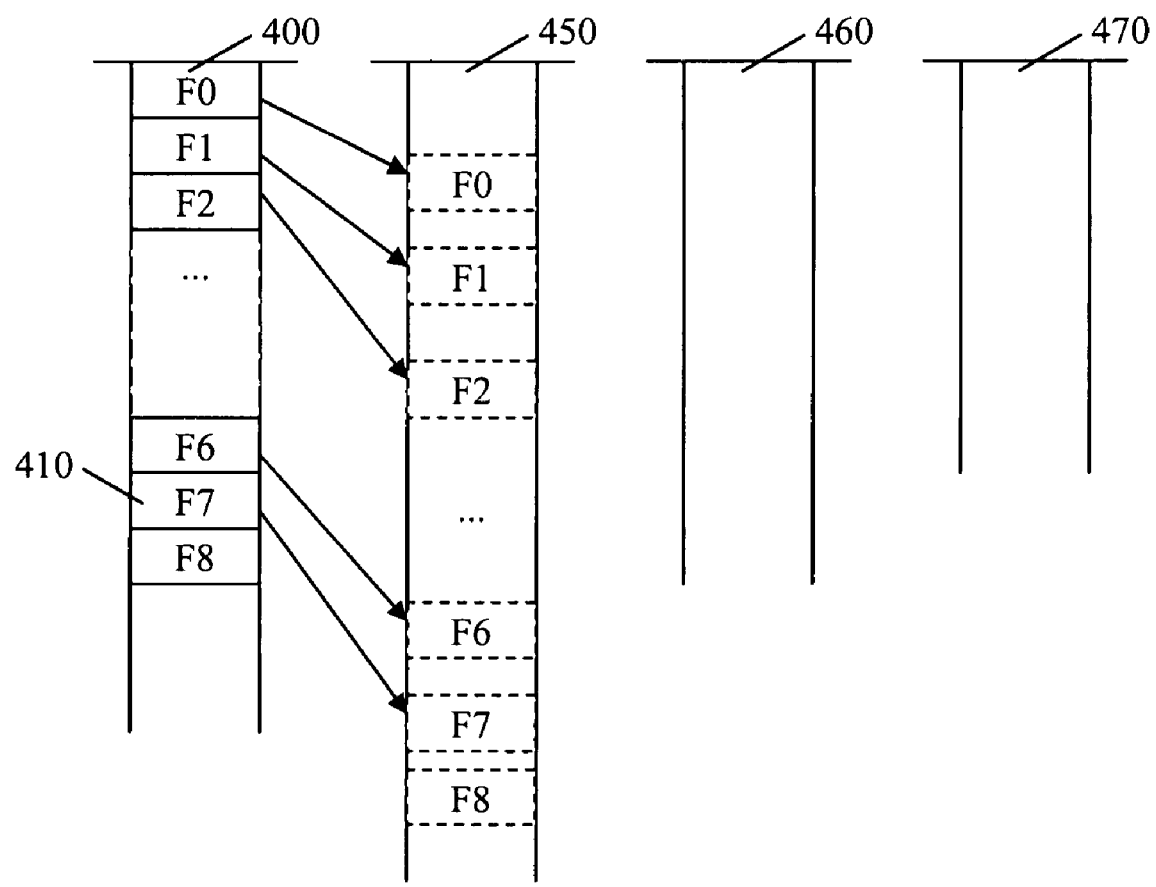
FIG. 10 is a schematic diagram showing selected parts of the memory in the computing system of the exemplary embodiment of the present invention.

FIG. 10 is a schematic diagram showing a plurality of stack data structures in the memory of the target computing architecture, to explain a further aspect of the present invention.

FIG. 10 illustrates the SR stack 400 as discussed above, again in this case shown growing vertically down the diagram. Also, a number of other stacks are defined in the memory 18 of the target computing architecture 10, as will be familiar to the skilled person. The illustrated stacks include a subject stack 450, a target stack 460, and a translator stack 470, amongst others. Here, the subject stack 450 emulates an execution stack (also termed a control stack or function stack) as would be provided in the subject architecture for execution of the subject code. That is, part of the process of program code conversion from subject code to target code involves the creation and manipulation of the subject stack 450 on the target architecture. The target stack 460 is a stack provided for execution of the target code 21. The translator stack 470 is a stack provided for execution of the translator 19. Each of these stacks, and other stacks, exist simultaneously in the memory 18 of the target architecture and are typically managed by the target operating system 20 in conjunction with the translator code 19 and target code 21, etc.

The subject stack 450 is of particular interest since, in the subject architecture 1, register spill operations transfer register values from the windowed hardware subject registers 502 onto the subject stack as provided in the memory 8 of the subject system. Conversely, fill operations in the subject architecture transfer register values from the subject stack to the windowed hardware subject registers 502. In the example V9 SPARC architecture, each SAVE type register movement causes space to be reserved on the execution stack which, when a spill operation is performed, will be filled with register values from registers 502 in a respective register window position 511. That is, as illustrated in FIG. 10, the subject code 17 (now translated into target code 21) may reasonably assume that required data values will, in certain circumstances, appear in the allocated space in the emulated version of the subject stack 450. However, unless such data values are in fact copied from the SR stack 400 to the emulated subject stack 450, the data values will not appear as expected.

FIG. 10 shows an example set of frames of entries on the SR stack 400. Here, the frames 410 are labelled F0 through F8. The frames each overlap as shown in FIG. 5, but are not shown as overlapping in FIG. 10 for clarity. Further, the individual entries 401 have not been shown in FIG. 10 again for clarity. To emulate the behaviour of the subject platform, spaces are reserved on the emulated execution stack 450 as each new frame 410 F0-F8 is added to the SR stack 400. Also, the emulated subject stack 450 is interspersed with other data such as temporary values and function call and return parameters, as required to emulate the effects on the subject stack by the executing subject code 17.

There are certain subject code instructions which specifically affect the transfer of data from the subject registers to the subject stack. In the v9 SPARC example discussed herein, a "flushw" instruction flushes all of the registers 502 from the windowed hardware subject registers 502 into the subject execution stack, except the current window position, by performing repetitive spill traps. The "flushw" instruction is implemented by causing a spill trap if any register window position (other than the current register window position) has valid contents. On the subject architecture, the number of window positions with valid contents is computed with reference to the CANSAVE control/status register.

Also, the programming language C may include native code libraries which are compiled specific to a particular subject computing platform. The C programming language includes instructions such as "setjmp" and "longjmp" which, although now widely considered to be archaic and notoriously difficult to implement, can appear in many real-world subject programs, especially legacy programs. The "setjmp" and "longjmp" instructions are typically used in the C programming language for non-local exits or for software exception handling. The setjmp function identifies return points by saving information about the execution environment at the point where the call to the setjmp function appears in the subject code. Execution of the subject program continues normally after the call to setjmp, until, at some later point, calling longjmp causes an exit to this return point, such that execution control is transferred back to the point where setjmp was called. The setjmp routine typically includes copying register values from the subject registers to the subject stack, and the longjmp function typically restores those values from the stack to the subject registers.

As another example, the programming language C may include processor-family-specific implementations, in assembly, of functions to create, save and restore a context, for use in signal handling or for user multi-threading. Some C libraries provide such routines under the names "getcontext", "setcontext", and "makecontext". The context functions are provided as if part of a native C library, but with specific implementations for specific hardware such as ARM, PowerPC, SPARC and x86.

As a further example, the higher-level programming language C++ provides instructions specifically to handle software exceptions. Although these C++ exception handling instructions are primarily intended for handling exceptional situations encountered during execution of a subject program, they are also a convenient programming construct in themselves and are often used to simplify a program's algorithm, in contrast to more typical "if" type instructions. Specifically, C++ exception instructions include "try", "catch" and "throw" instructions. Implementing these instructions in binary subject code executable by the subject processor thus involves the transfer of data between the subject registers and the subject stack.

There are many other situations which require such transfer of data including, for example, stack unwinding whereby the subject program walks back up the execution stack and hence requires valid subject register values to be present on the execution stack.

Figure 11:
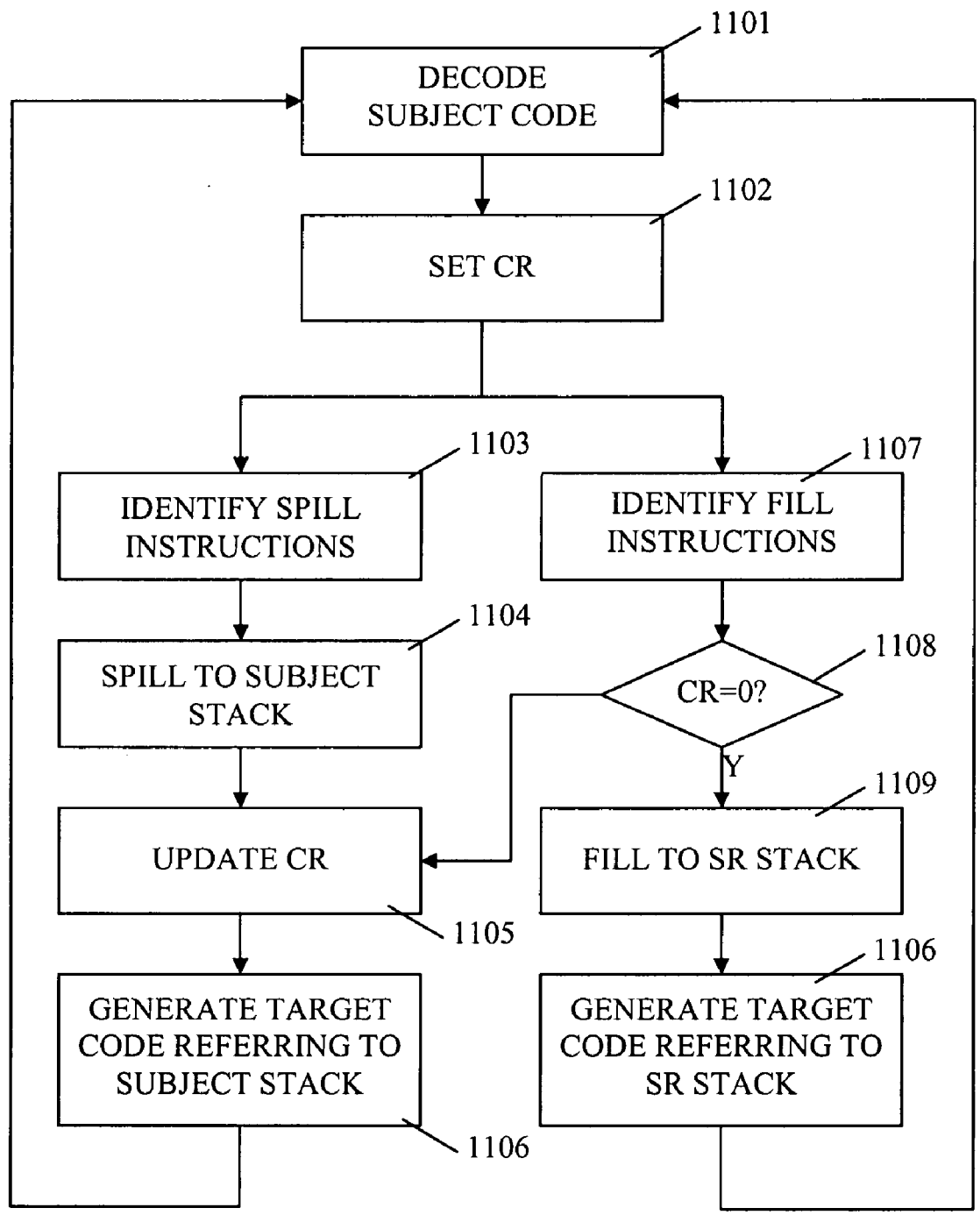
FIG. 11 is a schematic flow diagram illustrating an example method to perform a transfer mechanism of exemplary embodiments of the invention.

FIG. 11 is a schematic flow diagram illustrating a mechanism to transfer data values between the SR stack 400 used for emulating the windowed subject registers 502 and the subject stack 450 used to emulate the execution stack of the subject platform, and vice versa.

At step 1101, the subject code 17 is decoded to, inter alia, identify SAVE and RESTORE type register window movements 176 as discussed above. At step 1102, a CR counter is updated for each identified register window movement 176. Suitably, each SAVE adds +1 to the CR counter, and each RESTORE decrements −1 from the CR counter. Thus, as the subject program progresses, the CR counter counts the number of frames 410 of entries 401 on the SR stack 400. Also, at step 1103, subject instructions are identified which in the subject architecture require data values held in the windowed subject registers 502 to be saved to the subject execution stack, which here are termed SPILL type instructions. As a particular example for the SPARC subject architecture, the "flushw" subject instruction is identified. At step 1104, and as shown in FIG. 10, target code 21 is provided to flush a determined number of frames 410 of entries 401 from the SR stack 400 to the corresponding space allocated on the emulated subject stack 450. In this illustrated example of FIG. 10, the SR stack 400 contained entries for nine frames labelled F0 to F8. Here, the CR counter shows that eight earlier frames F0 to F7 (i.e. not including the current frame of entries F8) need to be copied from the SR stack 400 to the subject stack 400 (CR=8). At step 1105, following this repetitive spill operation, the CR counter is updated (reset) to zero to show that all of the required frames 410 have been copied from the SR stack 400 to the subject stack 450.

As noted above, in the subject architecture the "flushw" instruction invalidates all register window positions 511 except the current position and thus the subject execution stack now holds the canonical version of the subject register values for all previous register window positions. Some subject programs such as the C context functions, setjmp/longjump functions and C++ exceptions will alter the data values stored in the subject stack. Hence, in this emulated environment illustrated in FIG. 10, it is important to refer to the values now held in the emulated subject execution stack 450 rather than the (now potentially invalid) data in the entries 401 on the SR stack 400. Accordingly, at step 1106 the target code is now generated to access the desired data values on the emulated subject stack 450 where appropriate.

Step 1107 comprises identifying subject code instructions which in the subject architecture cause register values to be loaded into the windowed register file 502 from the subject execution stack, which here are termed here FILL type instructions. In the example SPARC subject architecture, this is suitably a "restore" instruction. In the emulated mechanism provided herein, the CR counter is tested at step 1108. If the CR counter is non-zero (CR>0) to indicate that one or more valid frames 410 exist in the SR stack 400, then at step 1105 the CR is updated (in this case decremented, CR=CR−1) in response to the RESTORE instruction and no data is copied from the subject stack 450. The subject "restore" here causes an adjustment of the stack pointer SR_SP to select a different frame 410 on the SR stack as discussed above. However, where the CR counter is zero (CR=0) to indicate that no valid earlier frames exist on the SR stack, then at step 1109 a fill operation is performed to copy a frame of data values from the subject stack 450 back to the SR stack 400 for use as the new current frame 410 following the RESTORE. The frame of data values from the subject stack 450 may have been modified by the subject program, and hence the canonical versions of these data values are now again available in the entries 401 of the SR stack 400 for subsequent use in the subject program. In particular, the SPARC architecture by convention stores the stack pointer for the subject stack in subject register o6 (also known by the alias sp). Due to the overlap of the register window positions 511, the stack pointer for a caller procedure is also available in the subject register i6. This previous stack pointer is termed the frame pointer (and can be accessed using the alias fp). Modifications to the stored register values typically involve changing the register values for the frame pointer (i6/fp) and/or the stack pointer (o6/sp). Thus, it is important that these data values are accurately maintained by the emulation mechanism discussed herein.

Figure 12A:
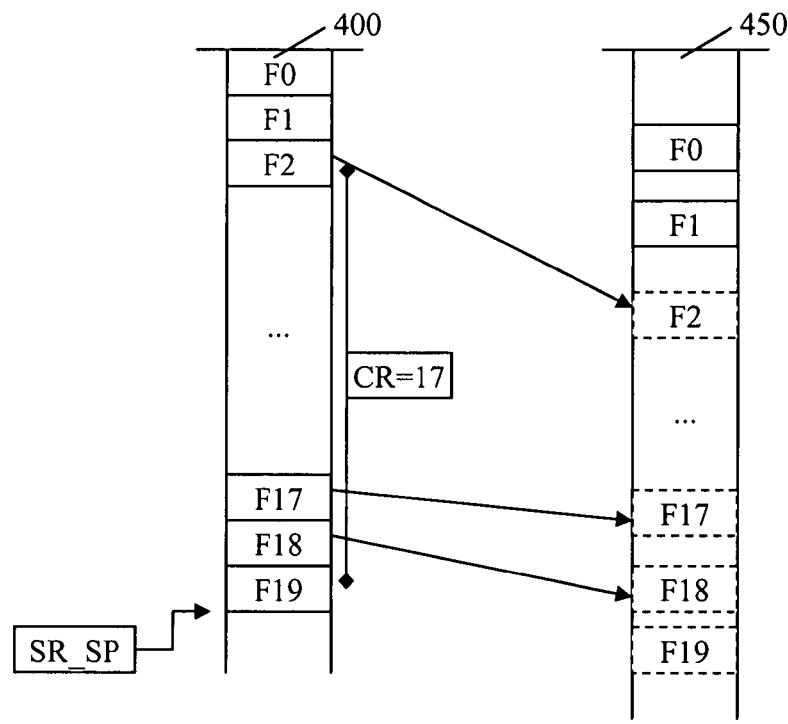
FIGS. 12A & 12B are schematic diagrams illustrating the transfer mechanism in more detail.

FIG. 12A shows an example spill operation in more detail. The operation "flushw" was performed earlier for frames labelled F0 and F1, and thus reset the CR counter to zero. Since that point, there have been (at least) seventeen further SAVE register movements to form frames F2 to F19 on the SR stack 400 as noted by the CR counter (CR=17). A SPILL instruction (i.e. "flushw") is identified in the subject code, which causes the seventeen frames of register values F19 to F2 to be copied from the SR stack 400 to the subject stack 450 and returns the CR counter to zero. All of the frames F2 to F18 are now invalid, and only the currently active frame F19 remains valid on the SR stack.

Figure 12B:
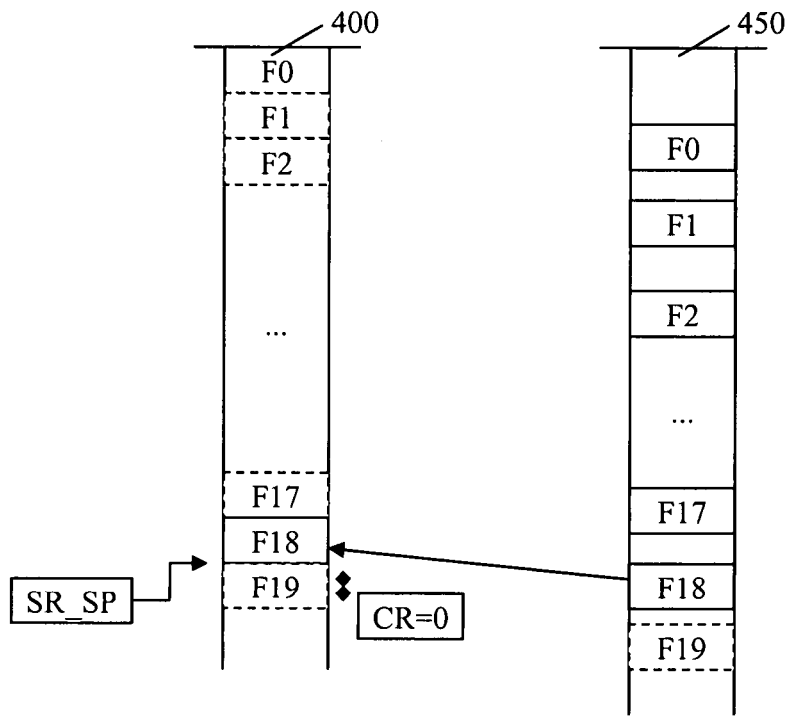

FIG. 12B shows an example fill operation in more detail, following on from the situation shown in FIG. 12A. Here, a RESTORE from the currently active frame F19 (where CR=0) causes a frame of register values to be loaded from the subject stack 450 to form the new current frame, here at F18, replacing the (invalid) values previously in that frame on the SR stack. Execution now continues using the register values loaded into the new current frame F18. The stack pointer for the SR stack SP_SRS is updated, immediately or at the end of a subject code block, to account for this register window movement.

Other specific embodiments of this transfer mechanism are also contemplated. In particular, following the spill operation ("flushw"), any suitable point on the SR stack may then be used as the new current frame, since "flushw" invalidates all register windows except the current window. For example, the SR stack can be cleared and the stack space reclaimed completely after each "flushw", or a default position on the SR stack may be set as the new current frame such as halfway along an allocated space for the stack.

At least some embodiments of the invention may be constructed solely using dedicated hardware, and terms such as 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed herein, such functional elements may be combined into fewer elements or separated into additional elements.

Although a few example embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computing system adapted to support a register window architecture, for use with subject code executable by a subject processor of a register window based subject computing architecture where a register window is positioned to reveal a selected subset of subject registers of the subject processor from a windowed register file, the subject code including window-based instructions which affect the register window and register-based instructions containing references to the subject registers in the register window, the computing system comprising:
 a decoder unit arranged to decode the subject code to derive register window movement information from the window-based instructions and to derive one or more windowed subject register references from the register-based instructions;
 a memory having a stack data structure arranged to store a plurality of entries;
 an encoder unit arranged to generate target code from the subject code decoded by the decoder unit; and
 a target processor arranged to execute the target code to set a stack pointer relevant to a head of the stack data structure in the memory, to adjust the stack pointer with reference to the register window movement information, and to access the entries in the stack data structure with reference to the stack pointer combined with displacements determined with respect to a respective one of the windowed subject register references.

2. The computing system of claim 1, wherein the decoder unit is arranged to identify one or more of the window-based instructions in the subject code which cause at least SAVE and RESTORE type movements of the register window, and to derive at least SAVE and RESTORE type register window movement information therefrom.

3. The computing system of claim 2, wherein the target processor is arranged to adjust the stack pointer in response to each said SAVE and RESTORE type register window movement information.

4. The computing system of claim 3, wherein the target processor is arranged to adjust the stack pointer by a predetermined offset in response to each said SAVE and RESTORE type register window movement information.

5. The computing system of claim 4, wherein the target processor is arranged to increment the stack pointer by the predetermined offset in response to each said SAVE type register window movement information and to decrement the stack pointer by the predetermined offset in response to each said RESTORE type register window movement information, or vice versa.

6. The computing system of claim 5, wherein the predetermined offset corresponds to a size of an addressable set of the windowed subject register references.

7. The computing system of claim 6, wherein the target processor is arranged to determine the displacement for each of the windowed subject register references with respect to a position of the respective windowed subject register reference within the addressable set of the windowed subject register references.

8. The computing system of claim 1, wherein the encoder unit is arranged to issue at least one target code instruction which causes the target processor to access a selected entry of the stack data structure by combining the adjusted stack pointer with the determined displacement.

9. The computing system of claim 1, wherein the target processor is arranged to determine a frame offset to adjust the stack pointer by a predetermined number of entries according to the register window movement information, and to adjust the stack pointer according to the determined frame offset and the determined displacement to access a selected entry from the stack data structure.

10. The computing system of claim 1, wherein the decoder unit is arranged to divide the subject code into a plurality of blocks according to the window-based instructions in the subject code from which the register window movement information is derived.

11. The computing system of claim 1, wherein the subject code includes at least one caller portion that performs a function call to a callee portion, and the encoder unit is arranged to generate a single block of target code which inlines the callee portion into the caller portion.

12. The computing system of claim 11, wherein the encoder unit is arranged to generate the target code instructions executed by the target processor to:
   i) access a selected entry from the stack data structure according to the windowed subject register reference identified in the caller portion of the subject code with reference to the displacement derived from the windowed subject register reference and the stack pointer;
   ii) increase a frame offset equivalent to a predetermined number of entries of the stack data structure according to the register window movement information derived from the caller portion of the subject code;
   iii) access a selected entry from the stack data structure according to a windowed subject register reference identified in the callee portion of subject code, with reference to the displacement derived from the windowed subject register reference and the stack pointer adjusted according to the frame offset; and
   iv) decrease the frame offset according to the register window movement information derived from the callee portion of subject code.

13. The computing system of claim 1, wherein:
the memory further comprises an emulated execution stack arranged to emulate an execution stack for execution of the subject code;
the decoder unit is arranged to decode the subject code to identify at least SAVE and RESTORE type register window movement information;
the encoder unit is arranged to generate the target code executed by the target processor to update a counter for each identified register window movement, including incrementing the counter for each SAVE and decrementing the counter for each RESTORE, whereby the counter counts a number of frames, each frame containing a predetermined number of the entries stored on the stack data structure;
the decoder unit is arranged to identify a SPILL type instruction in the subject code which would require a spill of data values held in the windowed subject register references derived from the register-based instructions in the subject code;
the encoder unit is arranged to generate the target code executed by the target processor to copy data values from entries in the stack data structure to corresponding entries allocated on the emulated execution stack in the memory, where the entries lie in a number of frames as determined by the counter;
the encoder unit is arranged to generate the target code executed by the target processor to reset the counter to a default value indicating that there are no valid frames of entries in the stack data structure; and
the encoder unit is arranged to generate the target code executed by the target processor to address the data values stored in the entries in the emulated execution stack in the memory.

14. The computing system of claim 13, wherein:
the decoder unit is further arranged to identify a FILL type instructions in the subject code which requires a fill of data values held in the entries in the emulated execution stack in the memory;
the encoder unit is arranged to generate the target code executed by the target processor to test the counter with respect to the default value, and
i) where testing the counter indicates that one or more valid frames of entries exist in the stack data structure, then to update the counter according to the identified FILL instruction, and
ii) where testing the counter indicates that no valid earlier frames of entries exist on the stack data structure, then to copy data values from a frame of entries of the emulated execution stack in the memory to the stack data structure in the memory as a current frame of entries in the stack data structure.

15. The computing system of claim 1, wherein the decoder unit is arranged to divide the subject code into a plurality of subject code blocks, and the encoder unit is arranged to generate the target code as a corresponding plurality of target code blocks interleaved with execution of the target code blocks by the target processor.

16. The computing system of claim 1, wherein the subject code is binary executable code and the target code is binary executable code.

17. A method of controlling a computing system adapted to support a register window architecture, comprising the steps of:
   (a) decoding subject code executable by a subject processor of a register window based subject computing architecture wherein a register window is positioned to reveal a selected subset of subject registers from a windowed register file, including the steps of:
      (a1) identifying a windowed subject register reference from an instruction in the subject code, where said windowed subject register reference comprises a reference to one of said subject registers in the register window;
      (a2) deriving a register window movement information from an instruction in the subject code for causing a movement of the register window;
   (b) providing a stack data structure in a memory of the computing system where the stack data structure is arranged to store a plurality of entries, and setting a stack pointer indicating a head of the stack data structure in the memory;
   (c) converting the subject code into target code and executing the target code on a target processor of the computing system, thereby performing the steps of:
      (c1) adjusting the stack pointer with reference to the identified register window movement information; and (c2) accessing at least one of the entries in the stack data structure, with reference to the stack pointer in combination with a displacement determined from the windowed subject register reference.

18. The method of claim 17, wherein:
the step (a2) comprises identifying one or more instructions in the subject code for causing at least SAVE and RESTORE type movements of the register window, and thereby deriving at least SAVE and RESTORE type register window movement information; and
the step (c1) comprises incrementing the stack pointer by a predetermined frame offset in response to each said SAVE type register window movement information and decrementing the stack pointer by a predetermined frame offset in response to each said RESTORE type register window movement information, or vice versa.

19. The method of claim 18, wherein each of the entries in the stack data structure corresponds to one of a set of windowed subject register references in the register-based instructions in the subject code; and
in the step (c1), the frame offset adjusts the stack pointer by a number of the entries on the stack data structure corresponding to the size of the set; and
in the step (c2), the displacement displaces the stack pointer by a number of the entries on the stack data structure according to a relative position of the windowed subject register reference within the set.

20. The method of claim 17, further comprising the step of dividing the subject code into a plurality of blocks according to the position of the instructions from which the register window movement information is derived and, for each such block, performing the steps (a), (b) and (c) with respect to the subject code instructions in the subject code block.

21. The method of claim 17, wherein the subject code includes at least one caller portion that performs a function call to a callee portion, and the step (c) further comprises providing a single block of the target code which inlines the callee portion into the caller portion.

22. The method of claim 21, further comprising the steps of:
providing the stack pointer having a first value and executing one or more target code instructions to access a selected entry from the stack data structure according a windowed subject register reference identified in the caller portion of subject code, with reference to the displacement derived from the windowed subject register reference and the first value of the stack pointer;
increasing a frame offset by a predetermined number of entries according to the register window movement information derived from the caller portion of subject code;
executing one or more target code instructions to access a selected entry from the stack data structure according to a windowed subject register reference identified in the callee portion of subject code, with reference to the displacement derived from the windowed subject register reference and the stack pointer as adjusted according to the frame offset; and
decreasing the frame offset according to the register window movement information derived from the callee portion of subject code.

23. The method of claim 18, further comprising:
providing an emulated execution stack in the memory of the computing system to emulate an execution stack for execution of the subject code;
decoding the subject code to identify at least the SAVE and RESTORE type register window movement information;
updating a counter for each such SAVE and RESTORE type register window movement information, including incrementing the counter for each SAVE and decrementing the counter for each RESTORE, whereby the counter counts a number of frames of the entries stored on the stack data structure;
identifying a SPILL type instruction in the subject code which requires a spill of data values held in the windowed subject registers addressed by the subject code into the execution stack;
copying data values from a number of frames of entries from the stack data structure to corresponding space allocated on the emulated execution stack, where the number of frames of entries is determined by the counter;
resetting the counter to a default value indicating that there are no valid frames of entries in the stack data structure; and
generating target code to address the data values stored on the emulated execution stack.

24. The method of claim 23, further comprising:
identifying a FILL type instruction in the subject code which requires a fill of data values held in the execution stack into the windowed subject registers addressed by the subject code;
testing the counter with respect to the default value;
where testing the counter indicates that one or more valid frames of entries exist in the stack data structure, then updating the counter according to the identified FILL instruction; and
where testing the counter indicates that no valid earlier frames of entries exist on the stack data structure, then copying a frame of data values from the emulated execution stack to the stack data structure for use as a current frame of entries.

25. A computer readable storage medium having recorded thereon computer implementable instructions which when executed adapt a computing system to support a register window architecture, wherein the computer readable storage medium comprises:
(a) a code unit arranged to decode subject code executable by a subject processor of a register window based subject computing architecture wherein a current register window is positioned to reveal a selected subset of subject registers from a windowed register file, including identifying a windowed subject register reference from an instruction in the subject code, where said windowed subject register reference comprises a reference to one of said subject registers in the register window; and deriving a register window movement information from an instruction in the subject code for causing a movement of the register window;
(b) a code unit arranged to provide a stack data structure in a memory of the computing system arranged to store a plurality of entries, and to set a stack pointer indicating a head of the stack data structure in the memory; and
(c) a code unit arranged to convert the subject code into target code and to cause execution of the target code on a processor of the computing system to adjust the stack pointer with reference to the identified register window movement information and to access at least one of the entries in the stack data structure with reference to the adjusted stack pointer in combination with a displacement determined from the windowed subject register reference.

* * * * *